United States Patent
Furuta

(10) Patent No.: US 8,064,196 B2
(45) Date of Patent: Nov. 22, 2011

(54) ELECTRONIC APPARATUS, ASSEMBLY STRUCTURE OF ELECTRONIC UNIT, AND BRACKET

(75) Inventor: Norimichi Furuta, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/923,036

(22) Filed: Aug. 30, 2010

(65) Prior Publication Data

US 2011/0002095 A1    Jan. 6, 2011

Related U.S. Application Data

(63) Continuation of application No. PCT/JP2008/056141, filed on Mar. 28, 2008.

(51) Int. Cl.
G06F 1/16 (2006.01)
H05K 5/00 (2006.01)
H05K 7/00 (2006.01)

(52) U.S. Cl. .............................. 361/679.37; 361/679.33

(58) Field of Classification Search . 361/679.33–679.45
See application file for complete search history.

(56) References Cited

U.S. PATENT DOCUMENTS

| | | | | |
|---|---|---|---|---|
| 4,672,510 A * | 6/1987 | Castner | | 361/679.32 |
| 5,301,088 A * | 4/1994 | Liu | | 361/679.58 |
| 5,327,323 A * | 7/1994 | Yeom et al. | | 361/679.37 |
| 5,349,483 A * | 9/1994 | Tsai | | 360/97.01 |
| 5,652,695 A * | 7/1997 | Schmitt | | 361/679.31 |
| 5,673,171 A * | 9/1997 | Varghese et al. | | 361/679.34 |
| 5,694,290 A * | 12/1997 | Chang | | 361/679.31 |
| 6,058,008 A * | 5/2000 | Chen et al. | | 361/679.34 |
| 6,122,165 A * | 9/2000 | Schmitt et al. | | 361/679.31 |
| 6,317,317 B1 * | 11/2001 | Lu et al. | | 361/679.33 |
| 6,351,378 B1 * | 2/2002 | Chao et al. | | 361/679.33 |
| 6,545,865 B2 * | 4/2003 | Albrecht et al. | | 361/679.34 |
| 6,563,701 B1 * | 5/2003 | Peng et al. | | 361/679.34 |
| 6,621,694 B2 * | 9/2003 | Lee et al. | | 361/679.34 |
| 6,762,936 B1 * | 7/2004 | Chang | | 361/679.58 |
| 6,775,132 B2 * | 8/2004 | Chen et al. | | 361/679.33 |
| 6,867,942 B2 * | 3/2005 | Albrecht et al. | | 360/69 |
| 6,873,524 B2 * | 3/2005 | Kaczeus et al. | | 361/679.33 |

(Continued)

FOREIGN PATENT DOCUMENTS

JP    5-266643    10/1993

(Continued)

OTHER PUBLICATIONS

International Search Report for PCT/JP2008/056141, mailed Jun. 10, 2008.

*Primary Examiner* — Jayprakash N Gandhi
*Assistant Examiner* — Adrian S Wilson
(74) *Attorney, Agent, or Firm* — Fujitsu Patent Center

(57) ABSTRACT

An electronic apparatus is disclosed, including a substrate; a unit body part on whose lateral surface the substrate is provided; and a bracket part configured to retain the unit body part. The bracket part includes a first bracket part and a second bracket part to which the first bracket part is slidably attached. The first bracket part is slid with respect to the second bracket part, and when the bracket part is at a close position, the first bracket part fixes the substrate by pressing the substrate in a slide direction and an approximately vertical direction, and the unit body part is fixed to the bracket part.

14 Claims, 18 Drawing Sheets

U.S. PATENT DOCUMENTS

| | | | |
|---|---|---|---|
| 6,882,528 B2 * | 4/2005 | Chuang | 361/679.35 |
| 7,113,398 B2 * | 9/2006 | Oba et al. | 361/679.37 |
| 7,139,166 B2 * | 11/2006 | Marcade et al. | 361/679.32 |
| 7,215,506 B2 * | 5/2007 | Albrecht et al. | 360/97.01 |
| 7,242,552 B2 * | 7/2007 | Kudo et al. | 360/97.02 |
| 7,242,554 B1 * | 7/2007 | Lin | 360/137 |
| 7,327,585 B1 * | 2/2008 | Fan et al. | 361/816 |
| 2003/0011980 A1 * | 1/2003 | Albrecht et al. | 361/685 |
| 2004/0023522 A1 * | 2/2004 | Chang | 439/43 |
| 2004/0032711 A1 * | 2/2004 | Kaczeus et al. | 361/685 |
| 2004/0100761 A1 * | 5/2004 | Liu | 361/685 |
| 2005/0013110 A1 * | 1/2005 | Shah et al. | 361/685 |
| 2006/0056146 A1 * | 3/2006 | Marcade et al. | 361/685 |
| 2006/0181845 A1 * | 8/2006 | Shah et al. | 361/685 |
| 2008/0037211 A1 * | 2/2008 | Martin et al. | 361/685 |

FOREIGN PATENT DOCUMENTS

| | | |
|---|---|---|
| JP | 2002-164120 | 6/2002 |
| JP | 2003-198153 | 7/2003 |

* cited by examiner

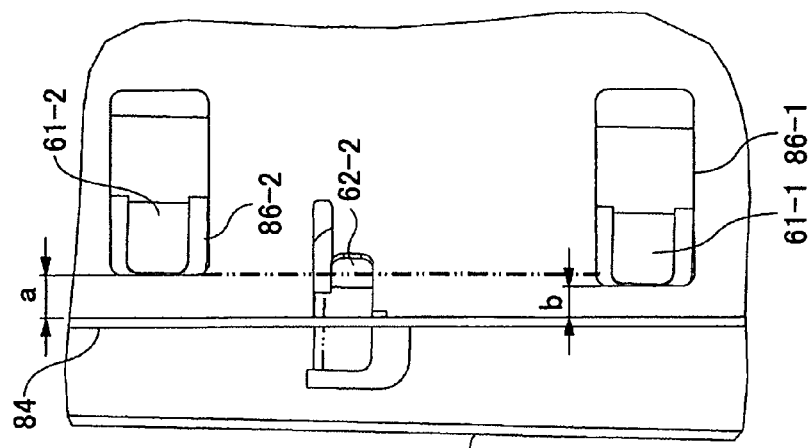
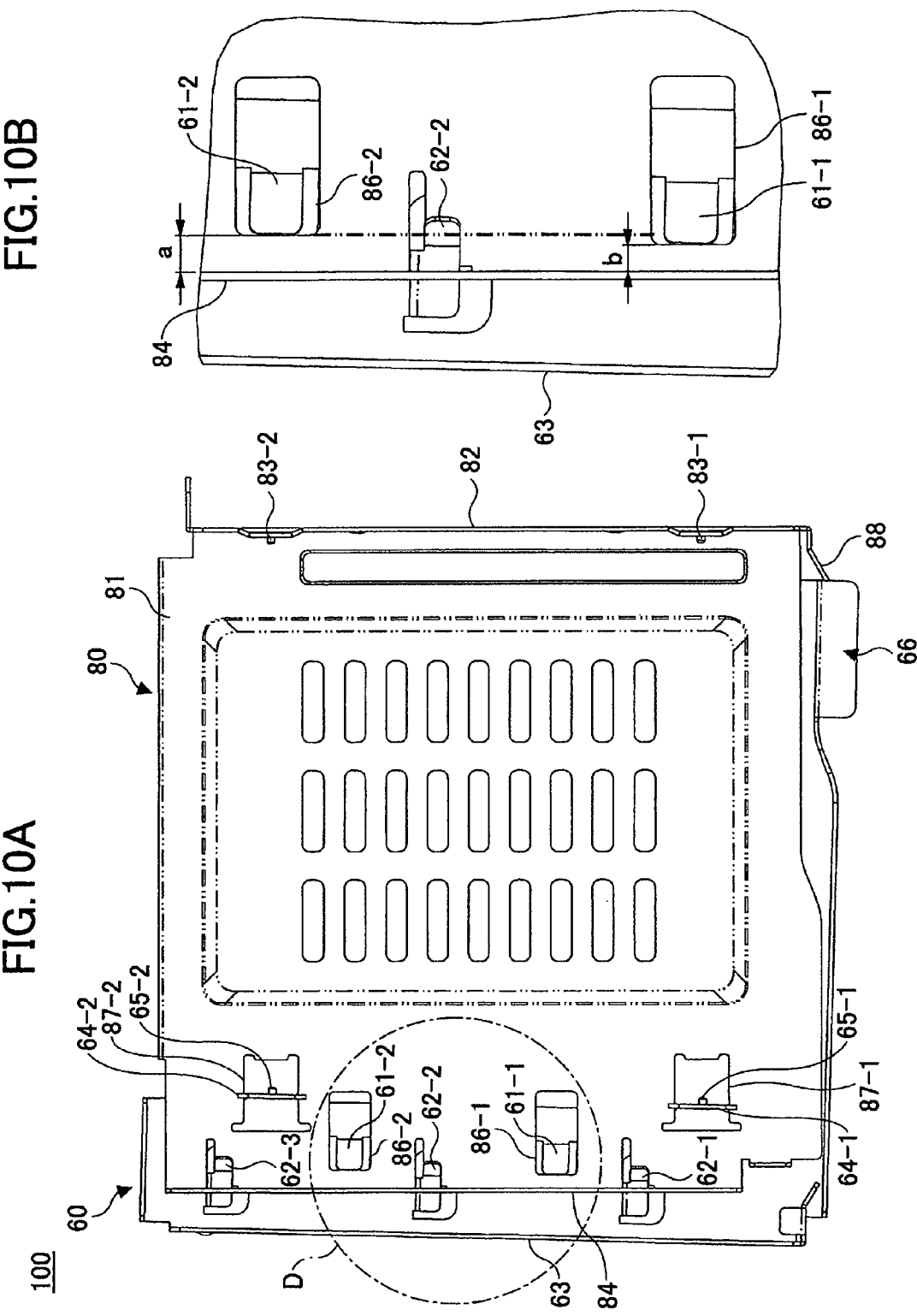

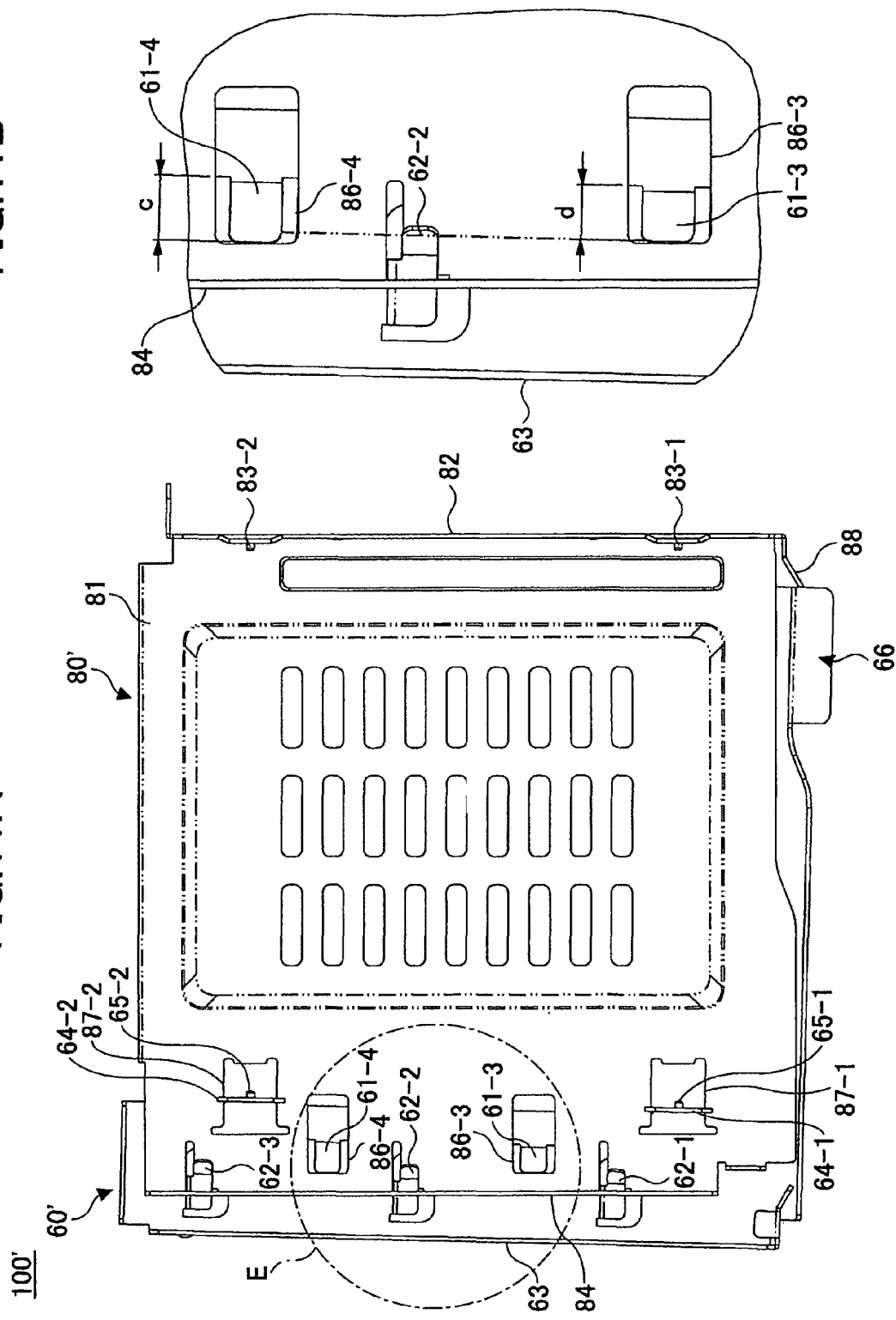

ELECTRONIC APPARATUS, ASSEMBLY STRUCTURE OF ELECTRONIC UNIT, AND BRACKET

CROSS-REFERENCE TO RELATED APPLICATION

This application is a U.S. continuation application filed under 35 USC 111(a) claiming benefit under 35 USC 120 and 365(c) of PCT application JP2008/056141, filed on Mar. 28, 2008. The foregoing application is hereby incorporated herein by reference.

FIELD

The present invention generally relates to an electronic apparatus, an assembly structure of an electronic unit, and a bracket.

BACKGROUND

Regarding an electronic apparatus such as an information processing apparatus as represented by a personal computer, multiproduct production by built-to-order manufacturing has been required. For example, for a so-called desktop-type information processing apparatus, in response to a request for minimizing the apparatus, use of a thin type optical disk drive having a thickness of 12.7 mm or 9.5 mm has begun, instead of an optical disk drive having a thickness of 5 inches (12.7 cm). In order to increase storage density of the information processing apparatus, a combination of the optical disk drive having the thickness of 5 inches (12.7 cm) together with the thin type optical disk drive having the thickness of 12.7 mm or 9.5 mm is applied in practical use.

On the other hand, for this type of the electronic apparatus, a maintenance inspection is also important. Thus, a method has been desired to easily assemble and disassemble components forming the electronic apparatus at a lower cost with reduced space.

FIG. 1A and FIG. 1B illustrate an electronic unit mounted inside a housing of a personal computer being a so-called desktop-type. FIG. 1B is a cross-sectional view taken on line A-A depicted in FIG. 1A. FIG. 2 is an exploded perspective view of the electronic unit depicted in FIG. 1A.

The electronic unit 10 depicted in FIG. 1A, FIG. 1B, and FIG. 2 is mounted inside the housing made of a sheet metal generally having a thickness of approximately 0.8 mm to 1 mm. The electronic unit 10 mainly includes a unit body part 1, a conversion substrate 2 attached on a lateral surface of the unit body part 1, a bracket part 3 to which the unit body part 1 is attached, and the like.

For example, an external surface of the unit body part 1 is made of aluminum and the like, and the optical disk drive (not shown) being a thin type is mounted inside the unit body part 1.

The bracket part 3 is made of a thin metallic plate or resin. As illustrated in FIG. 2, the unit body part 1 is attached to lateral surfaces 3b and 3c, which are formed extending in a vertical direction from a bottom surface 3a of the bracket part 3, by screws 4a and 4b. Also, the bracket part 3 is mounted inside the housing which is not depicted.

The conversion substrate 2 is fixed by screws 5a and 5b on a lateral surface which does not contact the bracket part 3, in lateral surfaces of the unit body part 1. Various types of connectors 6a through 6c are placed on the conversion substrate 2.

In others, Japanese Laid-open Patent Application No. 2002-164120 discloses a stopper mechanism which prevents a connector from slipping off or which prevents connector's looseness to be within a tolerance level possible to be electrically connected even if the connector become loose in a case of inserting in and mounting a memory card on the connector, and proposes a configuration for preventing the connector from slipping off due to an external shock to a mobile information terminal apparatus.

However, in aspects depicted in FIG. 1A, FIG. 1B, and FIG. 2, the unit body part 1 is attached to the bracket part 3 by the screws 4a and 4b. Accordingly, tools in addition to the screws 4a and 4b are required to attach the unit body part 1 to the bracket part 3, and an attachment operation process is required for each of the screws 4a and 4b. If it is attempted to reduce the number of the attachment operation processes, the number of components is increased, and a certain capacity is required for attachment operations.

Moreover, if the bracket part 3 is made of resin, first of all, it is difficult to fix the unit body part 1 with other than the screws 4a and 4b, and it is difficult to thinly form the resin. Thus, the bracket part 3 could be thicker. Also, in a case where the bracket part 3 is made of resin, it is required to separately conduct a process for grounding.

In addition, the bracket part 3 mounted on the unit body part 1 is fixed inside the housing which is not depicted. In order to fix the bracket part 3, components and operation processes are further required.

Furthermore, since the conversion substrate 2 to be mounted on the unit body part 1 is fixed on the lateral surface of the unit body part 1 by the screws 5a and 5b, components and operation processes are further required.

Also, for example, the external surface of the unit body part 1 is made of aluminum and the like. In a case where the bracket part 3 is made of metal such as a sheet metal, the bracket part 3 has higher strength than the unit body part 1. Thus, in a case where angles of bending the lateral surfaces 3b and 3c with respect to the bottom surface 3a of the bracket part 3 are defective, or in a case where a length between the lateral surfaces 3b and 3c of the bracket part 3 is wider than the unit body part 1, if the unit body part 1 is attached to the bracket part 3 by the screws 4a and 4b, the unit body part 1 is drawn to the screws 4a and 4b so that there are is mechanical play, and the unit body part 1 is in danger of being deformed. As a result, damage or a malfunction of the unit body part 1 may be caused.

As a response to the above problems, a highly accurate material may be used as a material of the bracket part 3, or a material more fragile than the material of the unit body part 1 may be used as a material configuring the bracket part 3. In the former case, production cost is increased. In the latter case, fastening itself of the unit body part 1 to the bracket part 3 could be weakened.

SUMMARY

According to an aspect of the embodiment, an electronic apparatus includes a substrate; a unit body part on whose lateral surface the substrate is provided; and a bracket part configured to retain the unit body part, the bracket part including; a first bracket part; and a second bracket part to which the first bracket part is slidably attached, wherein the first bracket part is slid with respect to the second bracket part, and when the bracket part is at a close position, the first bracket part fixes the substrate by pressing the substrate in a slide direction and an approximately vertical direction, and the unit body part is fixed to the bracket part.

According to another aspect of the embodiment, an assembly structure of an electronic unit includes the electronic unit; and an electronic apparatus housing configured to accommodate the electronic unit, wherein the electronic unit includes the assembly structure including: a substrate; a unit body part at whose lateral surface the substrate is mounted; and a bracket part configured to retain the unit body part, the bracket part including: a first bracket part; and a second bracket part to which the first bracket part is slidably mounted, wherein the first bracket part is slid with respect to the second bracket part, and when the bracket part is at a close position, the first bracket part fixes the substrate by pressing the substrate in a slide direction and an approximately vertical direction, and the unit body part is fixed to the bracket part.

According to a further aspect of the embodiment, a bracket for mounting an electronic unit part on an electronic apparatus includes a first bracket part; and a second bracket part to which the first bracket part is slidably attached, wherein the first bracket part is slid with respect to the second bracket part, and when the first bracket part and the second bracket part are at a close position, the first bracket part fixes a substrate at a lateral surface of the electronic unit by pressing in a slide direction and an approximately vertical direction, and the electronic unit body part is fixed.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF THE DRAWINGS

FIG. 10A is a plan view of the bracket part, and FIG. 10B is an enlarged view of a portion indicated by a dashed line D in FIG. 10A;

FIG. 11A is a plan view of a modification of the bracket part illustrated in FIG. 10, and FIG. 11B is an enlarged view of a portion circled by a dashed line E in FIG. 11A;

DESCRIPTION OF EMBODIMENT

In the following, an embodiment of the present invention will be described with reference to the accompanying drawings. As an example of an electronic apparatus, an electronic unit, which is mounted inside a housing of an information processing apparatus such as a so-called desktop-type a personal computer and in which an optical disk drive is mounted, will be illustrated in the embodiment.

Figure 3:
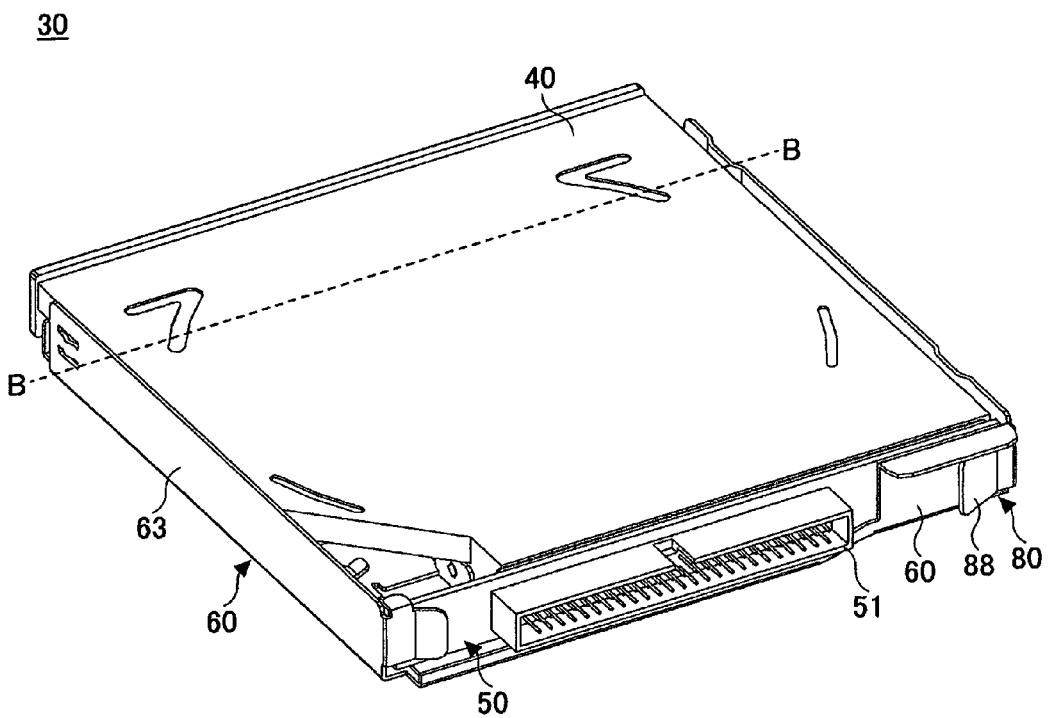
FIG. 3 is a perspective view of an electronic unit according to an embodiment.
Figure 4:
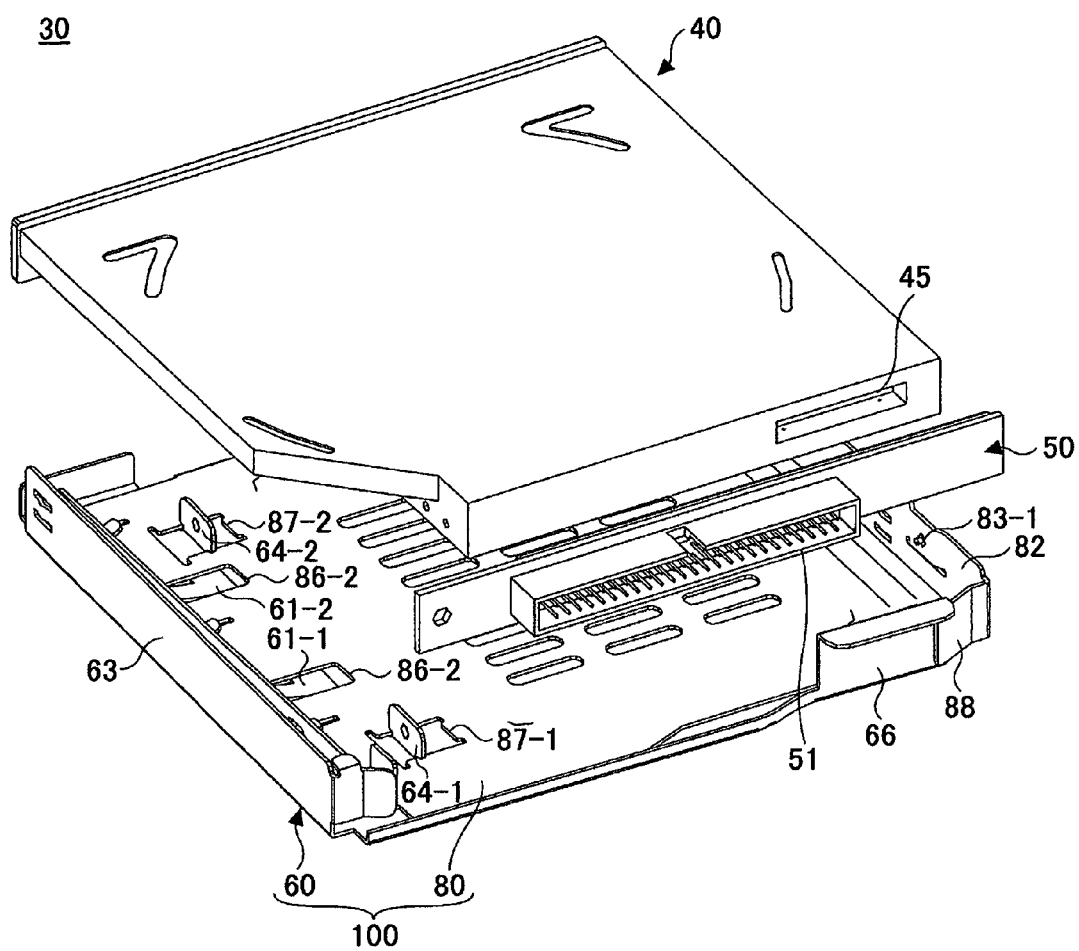
FIG. 4 is an exploded perspective view of the electronic unit illustrated in FIG. 3.

FIG. 3 is a perspective view of an electronic unit according to the embodiment. FIG. 4 is an exploded perspective view of the electronic unit illustrated in FIG. 3.

Referring to FIG. 3 and FIG. 4, the electronic unit 30 according to the embodiment is mounted inside the housing which is made of a sheet metal generally having a thickness of 0.8 mm through 1.0 mm. The electronic unit 30 mainly includes a conversion substrate 50 to be attached to a lateral surface of a unit body part 40, and a bracket part 100 (FIG. 4) to which the unit body part 40 is attached.

For example, the external surface of the unit body part 40 is made of aluminum or the like and a thin type optical disk drive (not illustrated) is mounted inside the unit body part 40.

The bracket part 100 is made of a metal plate or resin. Although details will be explained later, the bracket part 100 includes a first bracket part 60 and a second bracket part 80.

On one lateral surface of the unit body part 40, a connector socket 45 (refer to FIG. 4) is formed. A connector (not illustrated), which is provided on a rear surface of the conversion substrate 50 at which a front surface of a connector 51 is provided, is inserted into the connector socket 45, and then the conversion substrate 50 is attached to the unit body part 40.

A configuration of the bracket part 100 including the first bracket part 60 and the second bracket part 80 will be described with reference to FIG. 5 and FIG. 6.

The first bracket 60 has an approximate L shape in a plan view. On a surface forming a portion of a vertical side of the L shape, a stopper part 61-1 (first stopper part) and a stopper part 61-2 are formed in a slightly obliquely upward direction from the surface and extending from the surface. Also, in a direction approximately opposite to an extending direction of the stopper parts 61-1 and 61-2, claw parts 62-1, 62-2, and 62-3 are formed extending from the surface. Edges of the claw parts 62-1, 62-2, and 62-3 are formed in a slightly obliquely upward direction.

In a plane shape of the first bracket part 60, at an external edge of a surface forming the vertical side of the L shape, a lateral surface 63 is formed in a vertical direction from the surface of the portion. Also, a substrate fixing surface 67 is formed approximately parallel to a horizontal side of the L shape, extending from the lateral surface 63.

On a surface forming a portion of the vertical side of the L shape, at two places on an internal edge, wall parts 64-1 and 64-2 are formed in a vertical direction from the surface and are opposed to the lateral surface 63. Widths of the wall parts 64-1 and 64-2 are designed in which a bottom portion is shorter than an upper portion. For the wall parts 64-1 and 64-2, pins 65-1 and 65-2 are formed on surfaces facing to the lateral surface 63 and opposite surfaces, respectively.

In the plane shape of the first bracket part 60, at an external edge of a surface forming a portion of the horizontal side of the L shape, a substrate pressing surface 66 is formed in a vertical direction from the surface.

At a first lateral surface 82 formed in a vertical direction from a bottom surface 81 of the second bracket part 80, pins 83-1 and 83-2 are formed extending toward a second lateral surface 84, which is similarly formed in the vertical direction from the bottom surface 81.

At the second lateral surface 84, corresponding to the claws 62-1, 62-2, and 62-3 of the first bracket part 60, opening parts 85-1, 85-2, and 85-3 are respectively penetrated and formed to insert the claws 62-1, 62-2, and 62-3. Convex parts 90-1, 90-2, and 90-3 are formed in vicinities of the opening parts 85-1, 85-2, and 85-3, and are engaged with respective concave parts (not illustrated) which are formed on under surfaces of the claw parts 62-1, 62-2, and 62-3 being inserted into the opening parts 85-1, 85-2, and 85-3.

At the bottom surface 81 of the second bracket part 80, corresponding to the stopper parts 61-1 and 61-2 of the first bracket part 60, an opening part 86-1 (for a first stopper part) and an opening part 86-2 (for a second stopper part) are penetrated and formed, so that the stopper parts 61-1 and 61-2 can be inserted into the opening parts 86-1 and 86-2.

An opening width in a longitudinal direction of the opening part 86-1, that is, an opening width of the stopper part 61-1 in a movement direction of the stopper part 61-1 is set to be slightly longer than an opening width of a longitudinal direction of the opening part 86-2, that is, an opening width in the movement direction of the opening part 86-2. Details will be described later.

Also, on the bottom surface 81 of the second bracket part 80, corresponding to the wall parts 64-1 and 64-2 of the first bracket part 60, opening parts 87-1 and 87-2 are penetrated and formed, so that the wall parts 64-1 and 64-2 are inserted into the opening parts 87-1 and 87-2. The opening part 87-1 for the wall part 64-1 includes a portion having a width corresponding to a width of an upper portion of the wall part 64-1, and a portion having a width corresponding to a width of a bottom part of the wall part 64-1. Similarly, the opening part 87-2 for the wall part 64-2 includes a portion having a width corresponding to a width of an upper portion of the wall part 64-2, and a portion having a width corresponding to a width of a bottom part of the wall part 64-2.

Moreover, at an edge of the first lateral surface 82 of the second bracket part 80, a claw part 88 is formed extending in a slightly oblique direction toward the second lateral surface 84 which is placed opposite to the first lateral surface 82.

The first lateral surface 82 and the second lateral surface 84 of the second bracket part 80 are formed by bending a sheet metal. The opening parts 85-1 through 85-3 for the claws 62-1 through 62-3, the opening parts 86-1 and 86-2 for the stopper parts 61-1 and 61-2, and the opening parts 87-1 and 87-2 for the wall parts 64-1 and 64-2 are formed by a process of punching the sheet metal.

The wall parts 64-1 and 64-2 of the first bracket part 60 having the above-described configuration are inserted into the opening parts 87-1 and 87-2 of the second bracket part 80. The stopper parts 61-1 and 61-2 of the first bracket part 60 are inserted into the opening parts 86-1 and 86-2 of the second bracket part 80. Then, as illustrated in FIG. 5, the first bracket part 60 is attached to the second bracket part 80.

Figure 7A:
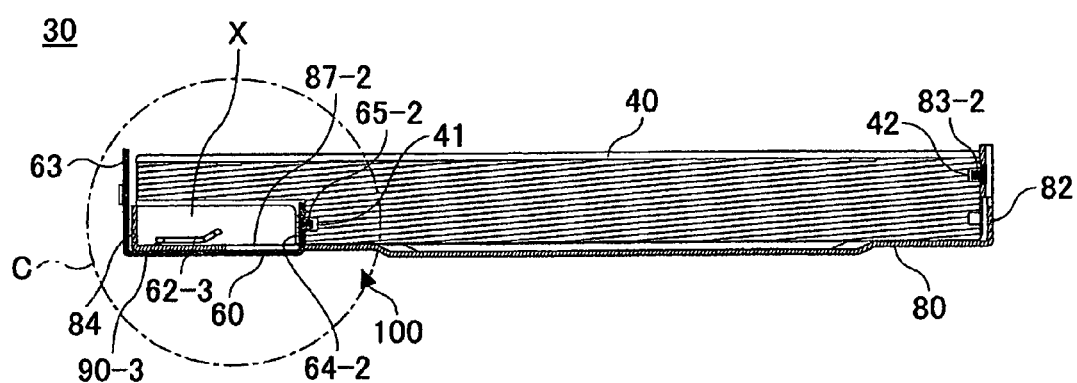
FIG. 7A is a cross-sectional view of the electronic unit illustrated in FIG. 3.
Figure 7B:
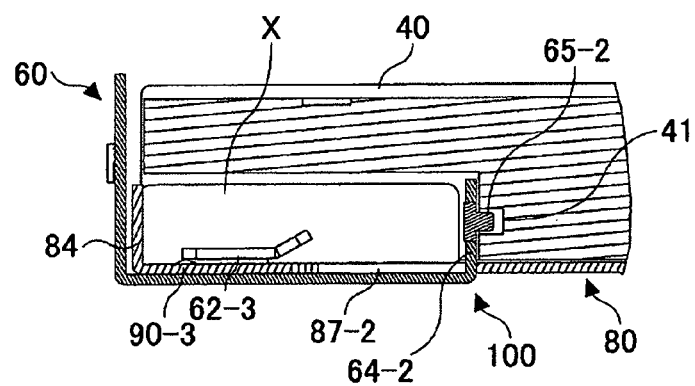
FIG. 7B is an enlarged view of a portion circled by a dashed line in FIG. 7A.

In a state (illustrated in FIG. 3) in which the unit body part 40 mounting the conversion substrate 50 is attached to the bracket part 100 which is formed by attaching the first bracket part 60 to the second bracket part 80, a cross-sectional view taken on line B-B is depicted in FIG. 7A. FIG. 7B illustrates an enlarged view of a portion circled by a dashed line in FIG. 7A.

As illustrated in FIG. 7A, when the unit body part 40 to which the conversion substrate 50 is provided is attached to the bracket part 100, which is formed by attaching the first bracket part 60 to the second bracket part 80, the pin 83-2 formed on the first lateral surface 82 of the second bracket part 80 is fit by inserting it into a concave part 42 formed on an external lateral surface of the unit body part 40. Also, the pin 65-2 formed on the wall part 64-2 of the first bracket part 60 is fit by inserting it into a concave part 41 formed on an internal lateral surface of the unit body part 40.

Figure 1A:
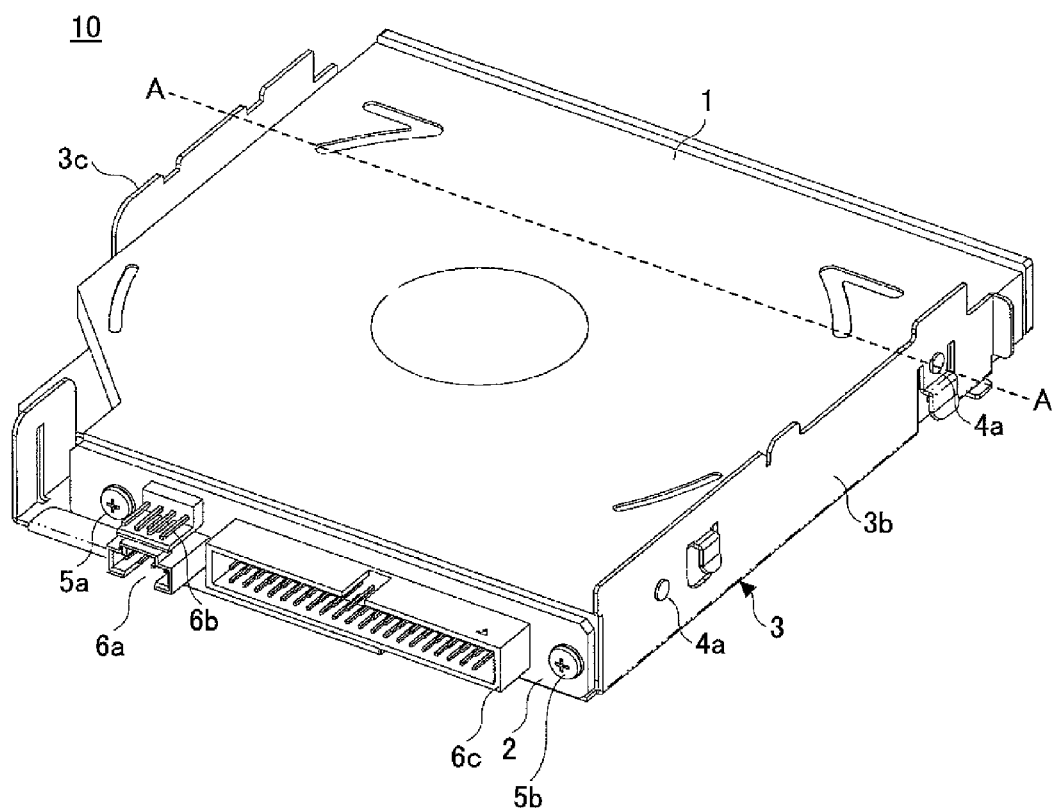
FIG. 1A is a perspective view of an electronic unit mounted on a so-called desktop-type of a personal computer.
Figure 1B:
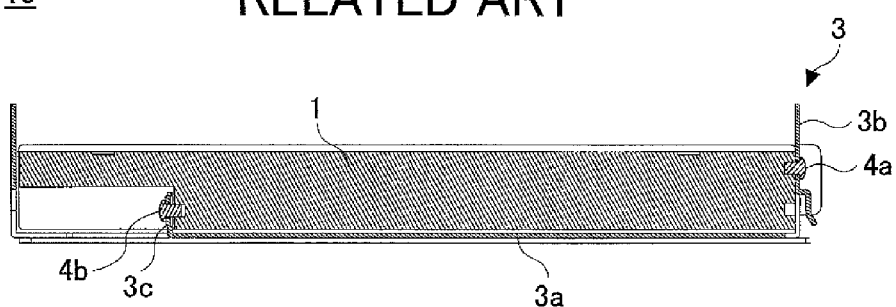
FIG. 1B is a cross-sectional view taken on line A-A depicted in FIG. 1A.
Figure 2:
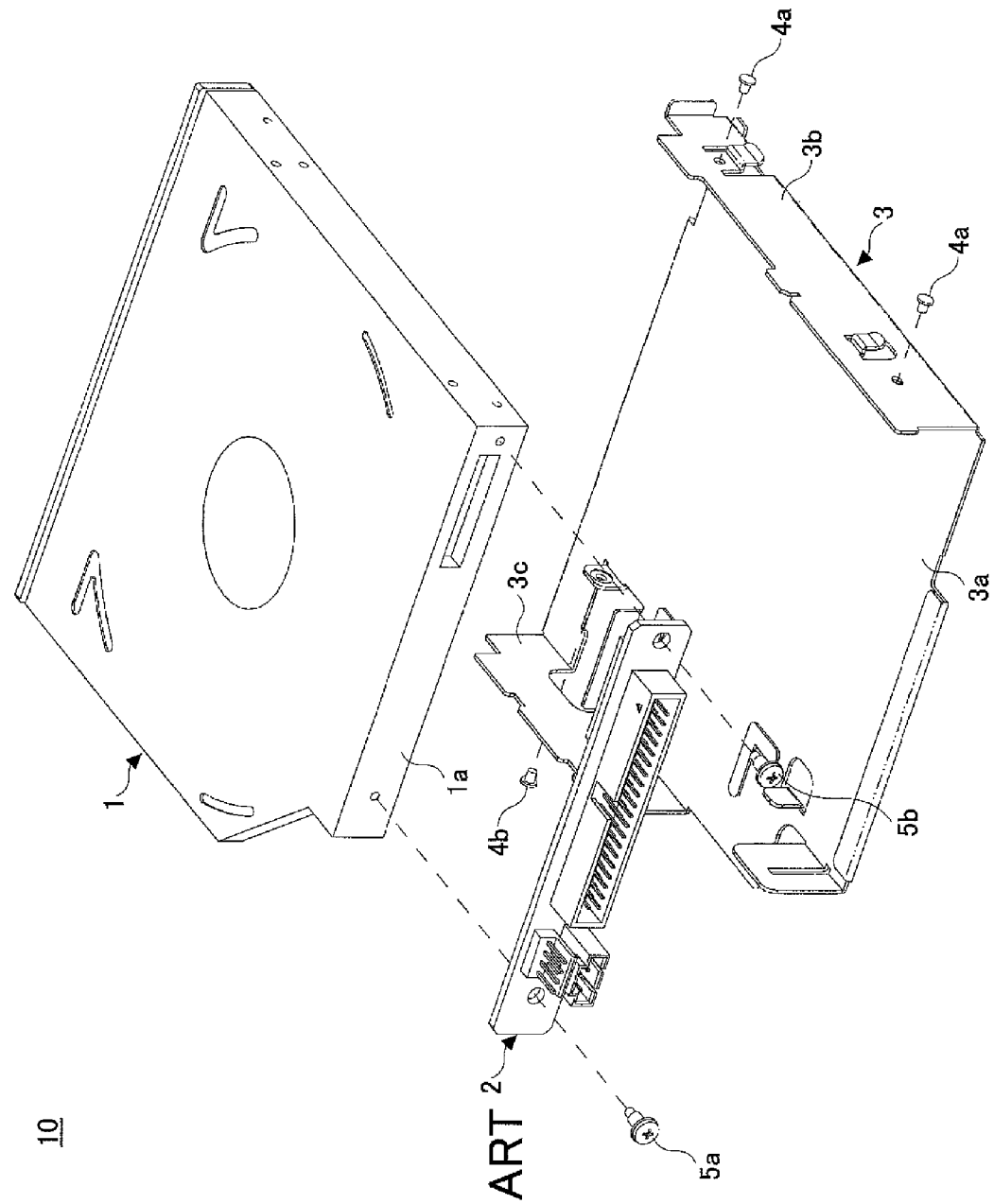
FIG. 2 is an exploded perspective view of the electronic unit depicted in FIG. 1A.
Figure 8A:
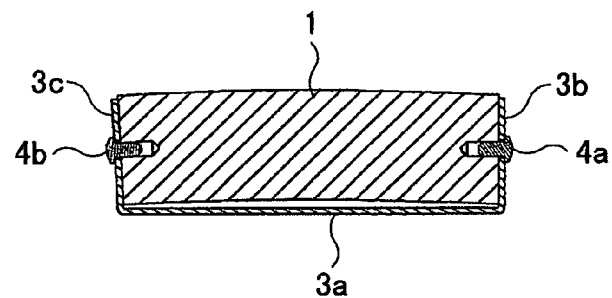
FIG. 8A is a schematic sectional view illustrating an aspect in which a unit body part and a bracket part are attached to each other by the screws as depicted in FIG. 1B (part 1)

Hereinafter, advantages of a configuration, in which the pin 83-2 formed on the first lateral surface 82 of the second bracket part 80 is fit by inserting it into the concave part 42 formed on the external lateral surface of the unit body part 40, and the pin 65-2 formed on the wall part 64-2 of the first bracket part 60 is fit by inserting it into the concave part 41 formed on the internal lateral surface of the unit body part 40, will be described with reference to FIG. 8A, FIG. 8B, FIG. 9A and FIG. 9B. FIG. 8A and FIG. 9A are schematic sectional views illustrating an aspect in which the unit body part and the bracket part are attached to each other by the screws as depicted in FIG. 1B, and FIG. 8B and FIG. 9B are schematic sectional views illustrating an aspect in which the unit body part and the bracket part are attached to each other by the pins as depicted in FIG. 7A.

As illustrated in FIG. 8A, in a case where the inclination angles of the lateral surfaces 3b and 3c with respect to the bottom surface 3a of the bracket part 3 have defects, when the unit body part 1 is attached to the bracket part 3 by the screws 4a and 4b, the unit body part 1 is drawn to the screws 4a and 4b so that there is no mechanical play, and the unit body part 1 is in danger of being deformed. As a result, it may cause damage or a malfunction of the unit body part 1.

Figure 8B:
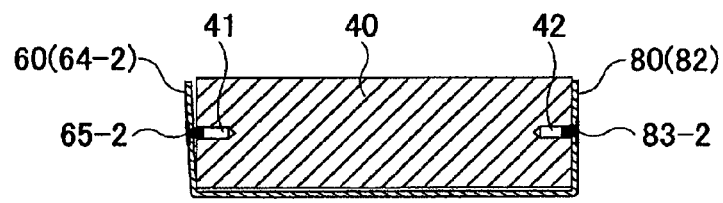
FIG. 8B is a schematic sectional view illustrating an aspect in which the unit body part and the bracket part are attached to each other by pins as depicted in FIG. 7A (part 1)
Figure 9A:
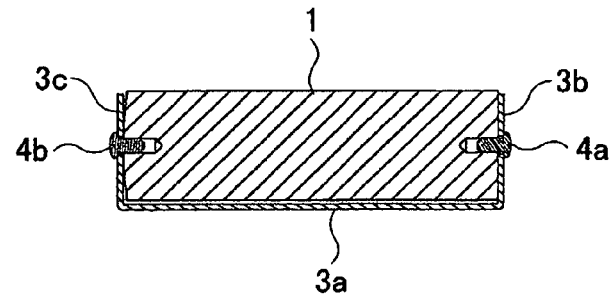
FIG. 9A is a schematic sectional view illustrating the aspect in which the unit body part and a bracket part are attached to each other by screws as depicted in FIG. 1B (part 2)
Figure 9B:
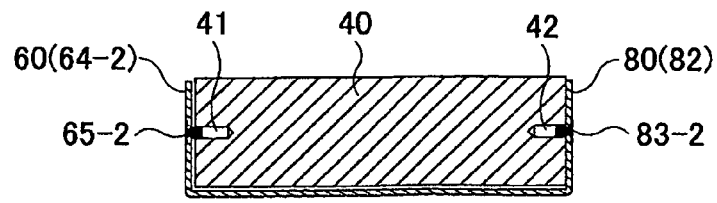
FIG. 9B is a schematic sectional view illustrating the aspect in which the unit body part and the bracket part are attached to each other by pins as depicted in FIG. 7A (part 2)

On the other hand, as illustrated in FIG. 8B, in the aspect in which the unit body part 40 and the bracket parts 60 and 80 are attached by using the pins 65-2 and 83-2, even if inclination angles of the first lateral surface 82 of the second bracket part 80 and the wall part 64-2 of the first bracket part 60 have defects, spaces between the concave parts 41 and 42 of the unit body part 40 and the pins 65-2 and 83-2 absorb the defects of the inclination angles, that is, distortion of the first lateral surface 82 and the wall part 64-2. Therefore, it is possible to prevent deformation of the unit body part 40.

Moreover, as illustrated in FIG. 9A, in a case where a length between the lateral surfaces 3b and 3c of the bracket part 3 is longer than a width of the unit body part 1, when the unit body part 1 is attached to the bracket part 3 by the screws 4a and 4b, the unit body part 1 is drawn to the screws 4a and 4b so that there is no mechanical play, and the unit body part 1 is in danger of being deformed. As a result, there may be caused damage to or malfunction of the unit body part 1.

On the other hand, as illustrated in FIG. 9B, in the aspect in which the unit body part 40 and the bracket parts 60 and 80 are attached by using the pins 65-2 and 83-2, even if the length between the first lateral surface 82 of the second bracket part 80 and the wall part 64-2 of the first bracket part 60 is longer than the width of the unit body part 40, the unit body part 40 is not drawn to the pins 65-2 and 83-2. Therefore, it is possible to prevent the deformation of the unit body part 40.

The wall parts 64-1 and 64-2 of the first bracket part 60 move inside the opening parts 87-1 and 87-2 of the second bracket part 80 for the wall parts 64-1 and 64-2. The stopper parts 61-1 and 61-2 of the first bracket part 60 move inside the opening parts 86-1 and 86-2 of the second bracket part 80 for the stopper parts 61-1 and 61-2. Also, the claws 62-1 through 62-3 of the first bracket part 60 move inside the opening parts 85-1 through 85-3 of the second bracket part 80. Thus, the first bracket part 60 can slide with respect to the second bracket part 80.

Accordingly, positions of the wall parts 64-1 and 64-2 of the first bracket part 60 clamping the unit body part 40 with the first lateral surface 82 of the second bracket part 80 are defined by the opening parts 87-1 and 87-2 of the second bracket part 80. In addition, positions of the wall parts 64-1 and 64-2 of the first bracket part 60 in the opening parts 87-1 and 87-2 of the second bracket part 80 are defined so that a length between the first lateral surface 82 of the second bracket part 80 and the wall parts 64-1 and 64-2 of the first bracket part 60 clamping the unit body part 40 is set to be longer than the width of the unit body part 40. Therefore, it is possible to reduce a load applied from the wall parts 64-1 and 64-2 of the first bracket part 60 to the unit body part 40.

Moreover, a space length between a length between the first lateral surface 82 of the second bracket part 80 and the wall parts 64-1 and 64-2 of the first bracket part 60 clamping the unit body part 40, and a width of the unit body part 40 is set to be narrower than a length of the pins 65-1 and 65-2 of the first bracket part 60 and a length of the pins 83-1 and 83-2 of the second bracket part 80. Accordingly, the unit body part 40 can be fixed between the first lateral surface 82 of the second bracket part 80 and the wall parts 64-1 and 64-2 of the first bracket part 60 clamping the unit body part 40.

Furthermore, as described above, an opening width in a longitudinal direction of the opening part 86-1 for the stopper parts 61-1 is set to be slightly longer than an opening width in a longitudinal direction of the opening part 86-2 for the stopper parts 61-2. That is, as illustrated in FIG. 10, a length "b" between an edge part at the lateral surface 63 of the opening part 86-1 and the second lateral surface 84 of the second bracket part 80 is set to be shorter than a length "a" between an edge part of the lateral surface 63 of the opening part 86-2 and the second lateral surface 84 of the second bracket part 80. FIG. 10A is a plan view of the bracket part 100 (refer to FIG. 4). FIG. 10B is an enlarged view of a portion indicated by a dashed line D in FIG. 10A.

Accordingly, a movement amount of the stopper part 61-1 of the first bracket part 60 moving in the opening part 86-1 of the second bracket part 80 is greater than a movement amount of the stopper part 61-2 of the first bracket part 60 moving in the opening part 86-2 of the second bracket part 80.

Accordingly, when the first bracket part 60 is attached to the second bracket part 80, the first bracket part 60 is made to slide to the second bracket part 80 in a state being slightly obliquely inclined in a plan view.

At a side where the opening part 86-1 and the stopper part 61-1 are provided, that is, at a side (a side near to the conversion substrate 50) where the conversion substrate 50 is fixed when the bracket part 100 is attached to the unit body part 40, a sliding amount of the first bracket part 60 to the second bracket part 80 is set to be greater than a sliding amount of the first bracket part 60 to the second bracket part 80 at a side where the opening part 86-2 and the stopper part 61-2 are provided, that is, at an opposite side (a side far from the conversion substrate 50) to a side where the conversion substrate 50 is fixed when the unit body part 40 is attached to the bracket part 100.

For example, in a case in which an inclination of the first bracket part 60 to the second bracket part 80 is set to be approximately 1.0 through 1.5 degrees, an inclination difference of approximately 0.03 mm occurs between the wall parts 64-1 and 64-2, the claw parts 62-1 through 62-3, and the like of the first bracket part 60, and the opening parts 87-1 and 87-2, the opening parts 85-1 through 85-2, and the like of the second bracket part 80. This inclination difference is within a range of a space between the first bracket part 60 and the second bracket part 80. For the substrate pressing surface 66 of the first bracket part 60, mechanical play of approximately more than 2 mm occurs.

As long as the first bracket part 60 can be slid on the second bracket part 80 in an approximately oblique state in a plan view when the second bracket part 80 is attached to the first bracket part 60, the embodiment is not limited to the example illustrated in FIG. 10, and the embodiment can be also applied to another example illustrated in FIG. 11A and FIG. 11B. FIG. 11A is a plan view of a modification of the bracket part 100 illustrated in FIG. 10. FIG. 11B is an enlarged view of a portion circled by a dashed line E in FIG. 11A. In FIG. 11A and FIG. 11B, components that are the same as the ones in FIG. 10A and FIG. 10B are indicated by the same reference numerals and the explanation thereof will be omitted.

In the modification illustrated in FIG. 11A and FIG. 11B, an opening width in a longitudinal direction of the opening part 86-3 is set to be equal to an opening width in a longitudinal direction of the opening part 86-4. However, a length "d" of an edge part of the stopper part 61-3 is set to be shorter than a length "c" of an edge part of a stopper part 61-4. Accordingly, a movement amount of the stopper part 61-3 of the first bracket part 60', which moves within the opening part 86-3 of the second bracket part 80', is greater than a movement amount of the stopper part 61-4 of the first bracket part 60', which moves within the opening part 86-4 of the second bracket part 80'.

Thus, when the first bracket part 60' is attached to the second bracket part 80', the first bracket part 60' can be slid relative to the second bracket part 80' in a slightly oblique state in a plan view.

In this modification, as illustrated in FIG. 3 and FIG. 4, the first bracket part 60, which has a shape made of thin sheet metal or the like and easily produced, is provided to be piled on the second bracket part 80. Furthermore, as illustrated in FIG. 7A and FIG. 7B, in a concave part "X" within the unit body part 40, the wall parts 64-1 and 64-2, the stopper parts 61-1 and 61-2, and the claw parts 62-1 through 62-3, and the like of the first bracket part 60, and the opening parts 87-1 and 87-2, the opening parts 86-1 and 86-2, the opening parts 85-1 through 85-3, and the like of the second bracket part 80 are positioned.

In the electronic unit 30 according to the modification, even at the thickest portion, the thickness is approximately 2 mm less than the thickness of the unit body part 40. Accordingly, it is possible to realize the electronic unit 30 saving space.

Next, an assembly structure of the electronic unit 30 including the above configuration will be described.

Figure 12:
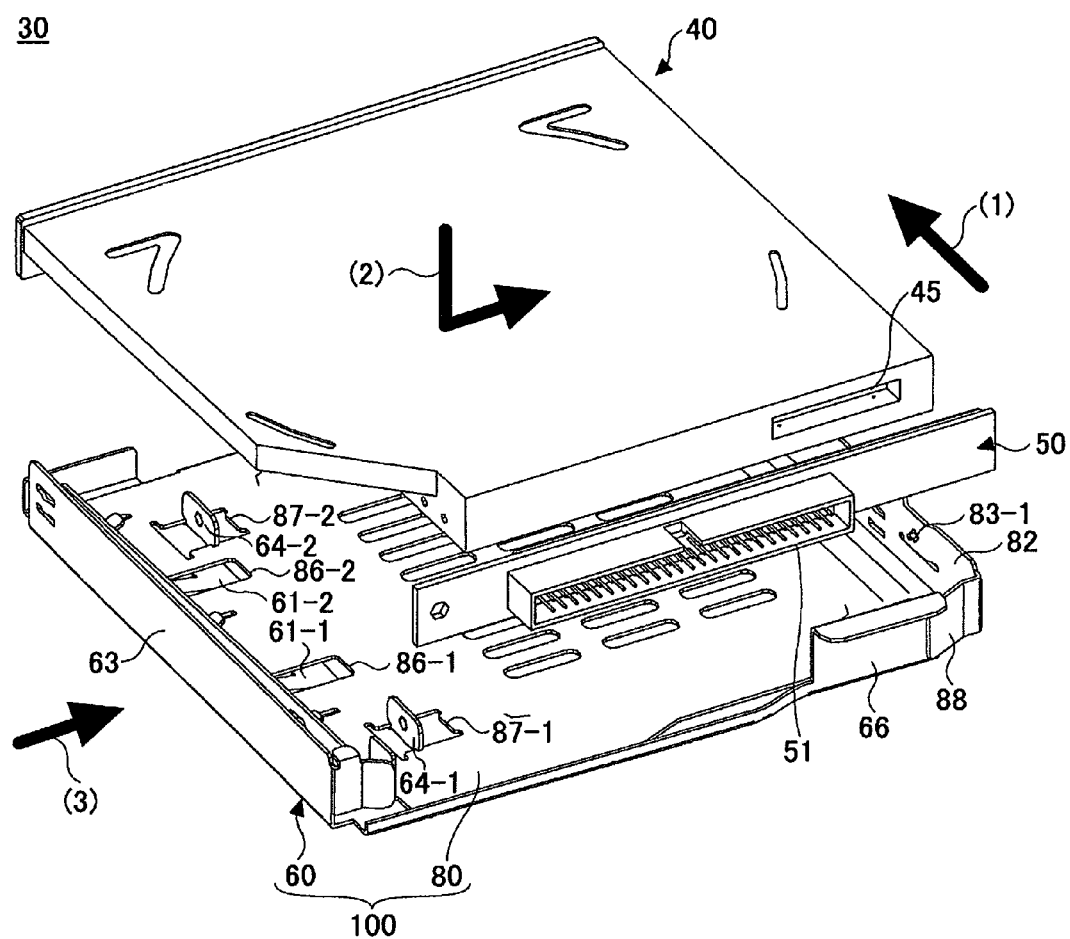
FIG. 12 is a diagram illustrating an assembly structure of the electronic unit according to the embodiment.

In assembling the electronic unit 30, as indicated by an arrow (1) in FIG. 12, the conversion substrate 50 is attached to the unit body part 40 by inserting a connector (not illustrated) provided on a reverse side of the conversion substrate 50 into the connector socket 45 (refer to FIG. 4) formed on one lateral surface of the unit body part 40

Subsequently, as indicated by an arrow (2) in FIG. 12, the pins 83-1 and 83-2 formed on the first lateral surface 82 of the second bracket part 80 are fit by inserting them into the concave parts 42 formed at two places on the external lateral surface of the unit body part 40 (refer to FIG. 7). The unit body part 40 to which the conversion substrate 50 is retained in the second bracket part 80.

Figure 13A:
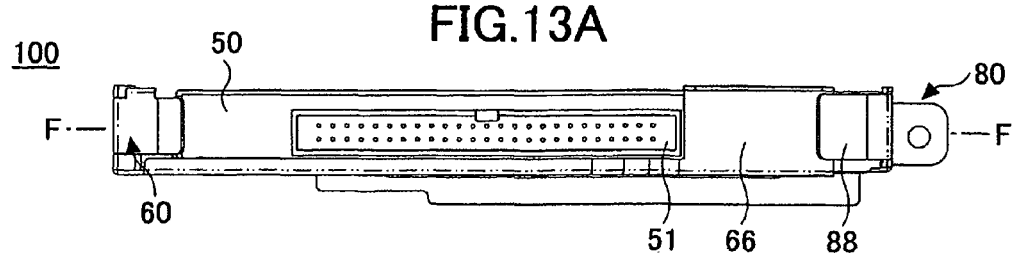
FIG. 13A is a lateral view of the bracket part.

From this state, a sliding configuration indicated by an arrow (3) in FIG. 12 with respect to the second bracket part 80 of the first bracket part 60 will be described with reference to FIG. 13 through FIG. 15. FIG. 13A illustrates a lateral view of the bracket part 100. FIG. 13B, FIG. 14A, and FIG. 15A illustrate cross-sectional views on line F-F depicted in FIG. 13A. FIG. 13C, FIG. 14B, and FIG. 15B illustrate enlarged views of a portion circled by a dashed line G in FIG. 13B, FIG. 14B, and FIG. 15A, respectively.

Figure 13B:
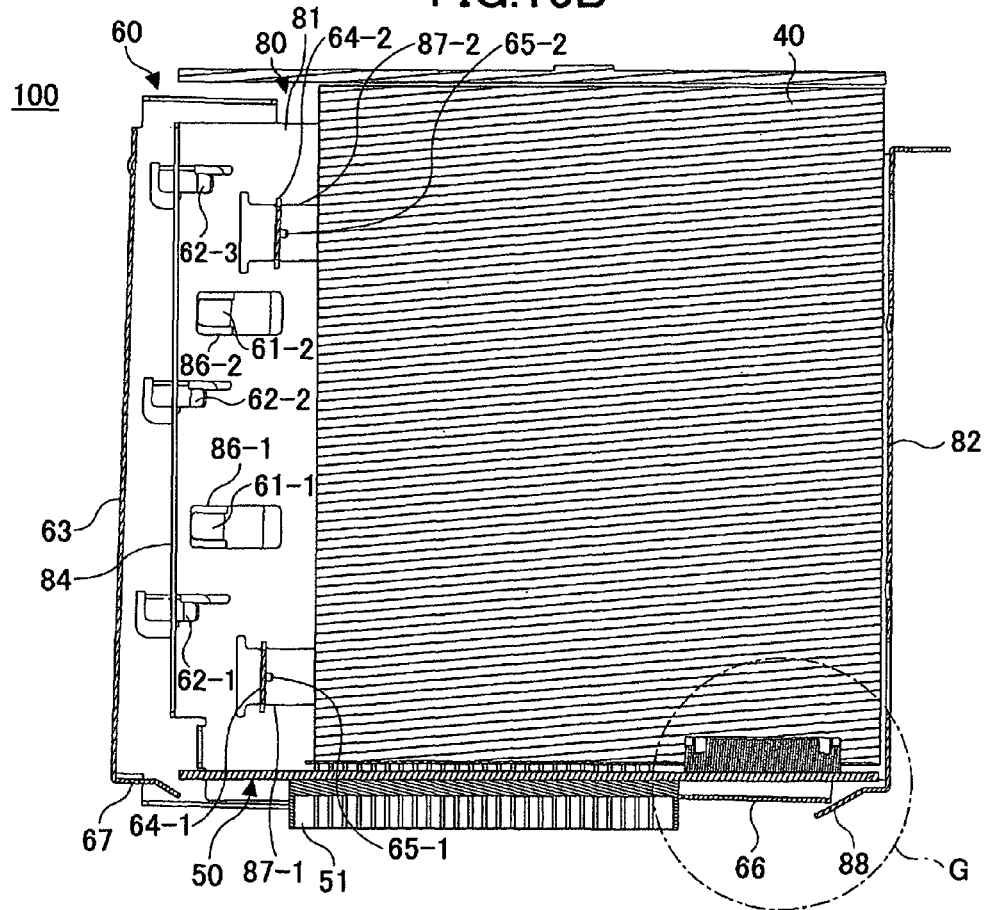
FIG. 13B is a cross-sectional view on line F-F depicted in FIG. 13A (part 1)
Figure 14A:
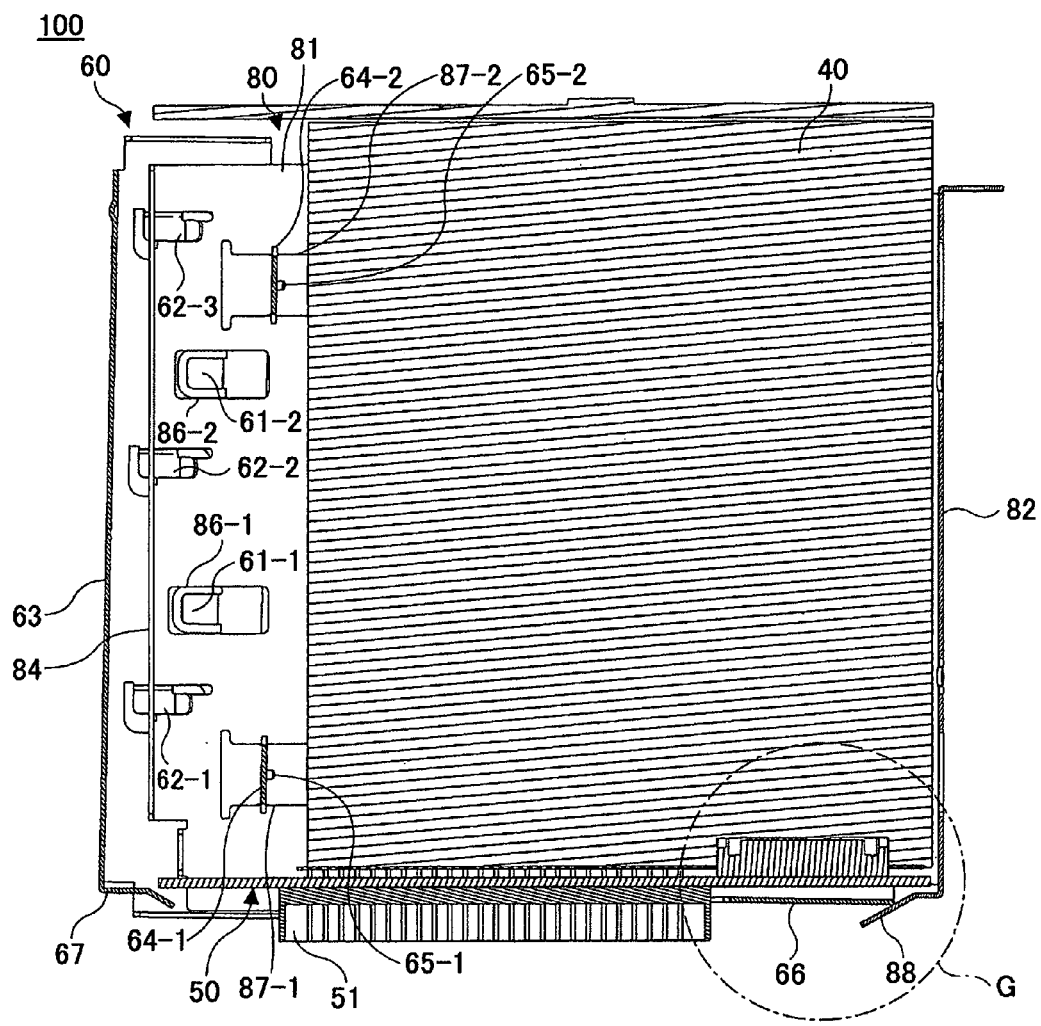
FIG. 14A a cross-sectional view on line F-F depicted in FIG. 13A (part 2)

First, as illustrated in FIG. 13B, the first bracket part 60 inclines with respect to the second bracket part 80. The first bracket part 60 is piled on and attached to the second bracket part 80 (an "open position" in claims).

In detail, the wall parts 64-1 and 64-2 of the first bracket part 60 are inserted into the opening parts 87-1 and 87-2 of the second bracket part 80. The stopper parts 61-1 and 61-2 of the first bracket part 60 are inserted into the opening parts 86-1 and 86-2 of the second bracket part 80. Also, the claw parts 62-1 through 62-3 of the first bracket part 60 are inserted into the opening parts 85-1 through 85-3 of the second bracket part.

Since the first bracket part 60 inclines with respect to the second bracket part 80 and the first bracket part 60 is piled on and attached to the second bracket part 80, a space is created at a portion pressing the conversion substrate 50. Therefore, even when the conversion substrate 50 is inserted into the unit body part 40, it is possible to easily attach the first bracket part 60 to the second bracket part 80.

Figure 13C:
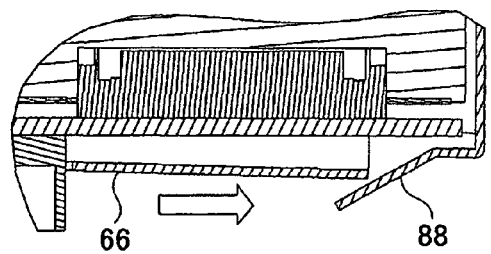
FIG. 13C is an enlarged view of a portion circled by a dashed line G in FIG. 13B (part 1)

From this state, the first bracket part 60 is slid to a direction indicated by a white arrow in FIG. 13C with respect to the second bracket part 80. As described above, the sliding amount of the first bracket part 60 relative to the second bracket part 80 is regulated by the opening part 86-1 with the stopper part 61-1 and the opening part 86-2 with the stopper part 61-2.

From this state, the first bracket part 60 is slid in a direction indicated by the white arrow in FIG. 13C with respect to the second bracket part 80. As illustrated in FIG. 14A, the substrate pressing surface 66 of the first bracket part 60 moves inside the claw part 88 along the claw part 88 of the second bracket part 80. That is, as illustrated in FIG. 14B, the substrate pressing surface 66 of the first bracket part 60 moves to a direction indicated by the white arrow, and further moves inside the claw part 88 along the claw part 88 of the second bracket part 80 as indicated by a black arrow.

Figure 15A:
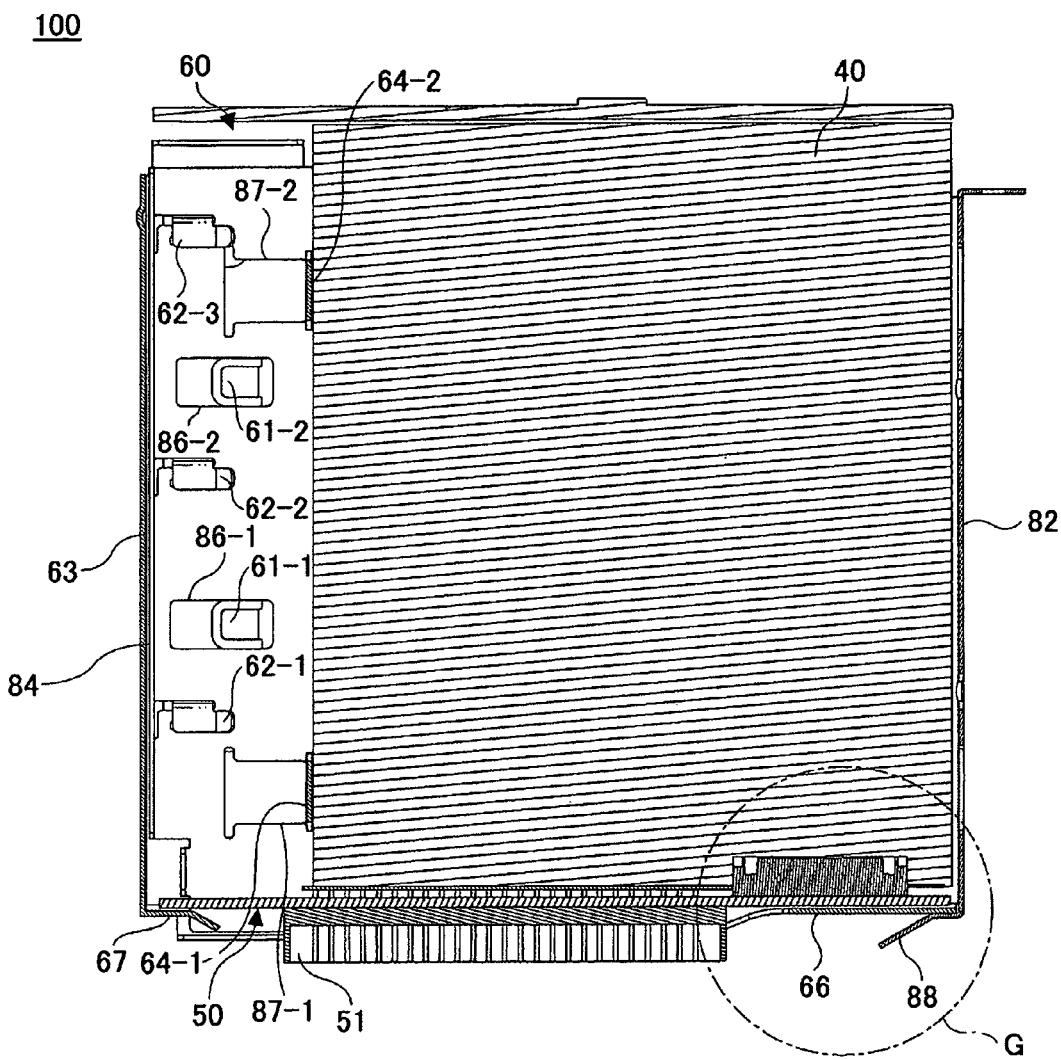
FIG. 15A a cross-sectional view on line F-F depicted in FIG. 13A (part 3)
Figure 15B:
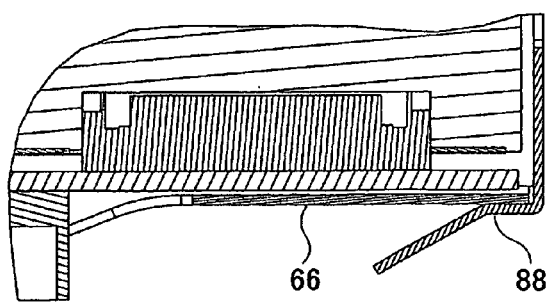
FIG. 15B is an enlarged view of the portion circled by the dashed line G in FIG. 13B (part 3)

Finally, as indicated in FIG. 15A and FIG. 15B, the substrate pressing surface 66 of the first bracket part 60 enters between the claw part 88 of the second bracket part 80 and the conversion substrate 50. The conversion substrate 50 is also fixed by the substrate fixing surface 67 of the first bracket part 60. Accordingly, in a state fixing the unit body part 40, it is possible to fix the conversion substrate 50 without looseness occurring at a connector portion of the conversion substrate 50 (a "close position" in claims).

Furthermore, a direction of pressing the conversion substrate 50 is the same as a direction of inserting the connector of the conversion substrate 50. Therefore, it is possible to fix the conversion substrate 50 without its being loosened in retaining the unit body part 40 to be fixed, in a state in which extra loads are not applied to the unit body part 40 and the connector portion of the conversion substrate 50.

Moreover, as illustrated in FIG. 15A and FIG. 15B, when the substrate pressing surface 66 of the first bracket part 60 enters between the claw part 88 of the second bracket part 80 and the conversion substrate 55, the pins 65-1 and 65-2 formed on the wall part 64-2 of the first bracket part 60 are fixed by inserting them into the concave parts 41 formed at two places on the internal lateral surface of the unit body part 40.

The wall parts 64-1 and 64-2 of the first bracket part 60 are caught inside the opening parts 87-1 and 87-2 of the second bracket part 80. The claw parts 62-1 through 62-3 of the first bracket part 60 are caught inside the opening parts 85-1 through 85-3 of the second bracket part 80. Thus, the first bracket part 60 is fixed to the second bracket part 80.

Only in a case of closing the first bracket 60 with respect to the second bracket 80 (sliding in a direction indicating the white arrows in FIG. 13C and FIG. 14B), the stopper parts 61-1 and 61-2 of the first bracket part 60 have a spring nature. In this case, the stopper parts 61-1 and 61-2 of the first bracket part 60 are not regulated to move inside the opening parts 86-1 and 86-2 of the second bracket part 80.

As described above, positions of the wall parts 64-1 and 64-2 of the first bracket part 60 clamping the unit body part 40 with the first lateral surface 82 of the second bracket part 80 are defined by the opening parts 87-1 and 87-2 of the second bracket part 80. In addition, positions of the wall parts 64-1 and 64-2 of the first bracket part 60 in the opening parts 87-1 and 87-2 of the second bracket part 80 are defined so that a length between the first lateral surface 82 of the second bracket part 80 and the wall parts 64-1 and 64-2 of the first bracket part 60 clamping the unit body part 40 is set to be longer than the width of the unit body part 40. Therefore, it is possible to reduce the load applied from the wall parts 64-1 and 64-2 of the first bracket part 60 to the unit body part 40.

Figure 14B:
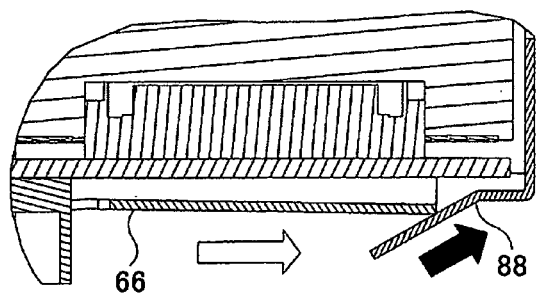
FIG. 14B is an enlarged view of the portion circled by the dashed line G in FIG. 13B (part 2)

On the other hand, only in a case of opening the first bracket part 60 with respect to the second bracket part 80 (sliding to an opposite direction to the direction indicated by the white arrows in FIG. 13C and FIG. 14B), the stopper parts 61-1 and 61-2 of the first bracket part 60 do not have the spring nature. In this case, movements of the stopper part 61-1 and 61-2 of the first bracket part 60 are regulated by edge surfaces of the opening parts 86-1 and 86-2 of the second bracket part 80. Thus, the attachment of the first bracket part 60 to the second bracket part 80 cannot be released.

By the above-described attachment steps, the unit body part 40 and the conversion substrate 50 can be easily and firmly fixed to the first bracket part 60 and the second bracket part 80. Also, it is possible to test this fixation only by clamping with the first bracket part 60 and the second bracket part 80, instead of using a fastening component and tool such as a screw, and the like. Therefore, it is possible to reduce the number of operation processes.

Moreover, in this configuration, in fixing the conversion substrate 50 and the unit body part 40 by the first bracket part 60 and the second bracket part 80, tools and the like are not used. By simply providing an area of sliding the first bracket part 60 with respect to the second bracket part 80 and area of inserting the unit body part 40 to the pins 83-1 and 83-2 of the second bracket part 80, the conversion substrate 50 and the unit body part 40 are easily fixed together by the first bracket part 60 and the second bracket part 80. As a result, it is possible to reduce the number of components forming the bracket part 100, and thus, it is possible to reduce production cost. In addition, it is possible to reduce the number of components decomposed from the electronic unit 30, and thus, it is possible to easily handle components of the electronic unit 30.

Moreover, a direction pressing the conversion substrate 50 is the same as a direction inserting the connector of the conversion substrate 50. Therefore, it is possible to fix the conversion substrate 50 without its being loosened in retaining the unit body part 40 to be fixed, in a state in which extra loads are not applied to the unit body part 40 and the connector portion of the conversion substrate 50. Moreover, lengths of the pins 65-1 and 65-2 of the first bracket part 60 can be shortened and lengths of the pins 83-1 and 83-2 of the second bracket part 80 can be shortened.

The first lateral surface 82 and the second lateral surface 84 of the second bracket part 80 are formed by bending sheet metal. The opening parts 85-1 through 85-3 for the claws 62-1 through 62-3, the opening parts 86-1 and 86-2 for the stopper parts 61-1 and 62-1, and the opening parts 87-1 and 87-2 for the wall parts 64-1 and 64-2 are formed by a process punching the sheet metal. Therefore, it is possible to easily and inexpensively ensure accuracy of necessary components.

Figure 16A:
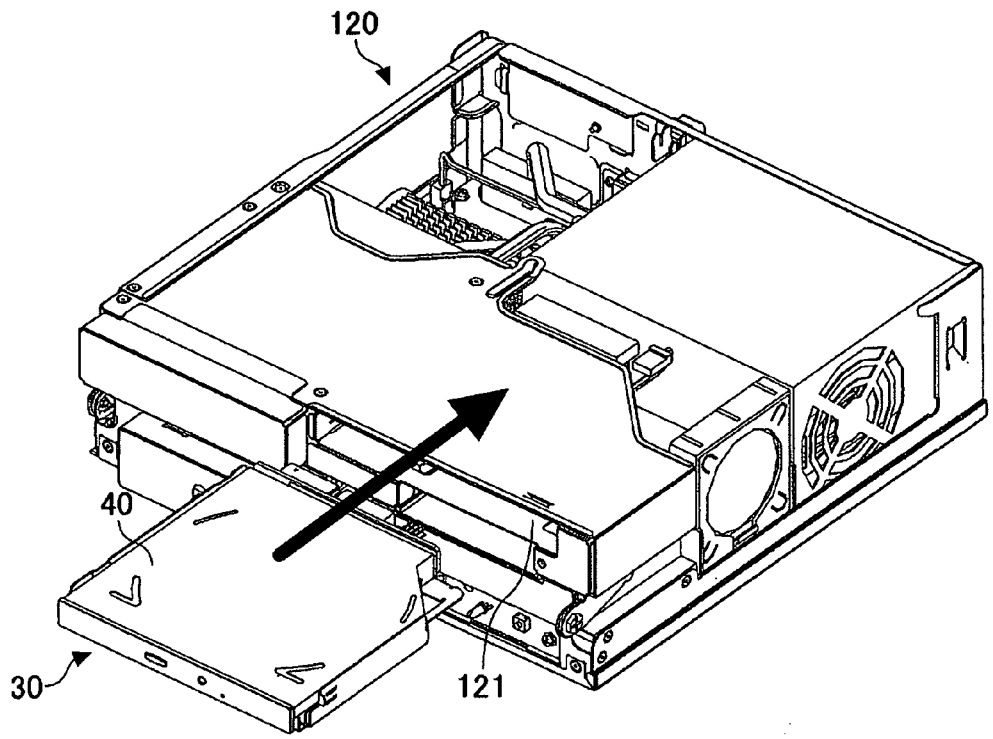
FIG. 16A and FIG. 16B are diagrams illustrating a structure for accommodating the electronic unit depicted in FIG. 3 into a housing body of an electronic apparatus.
Figure 16B:
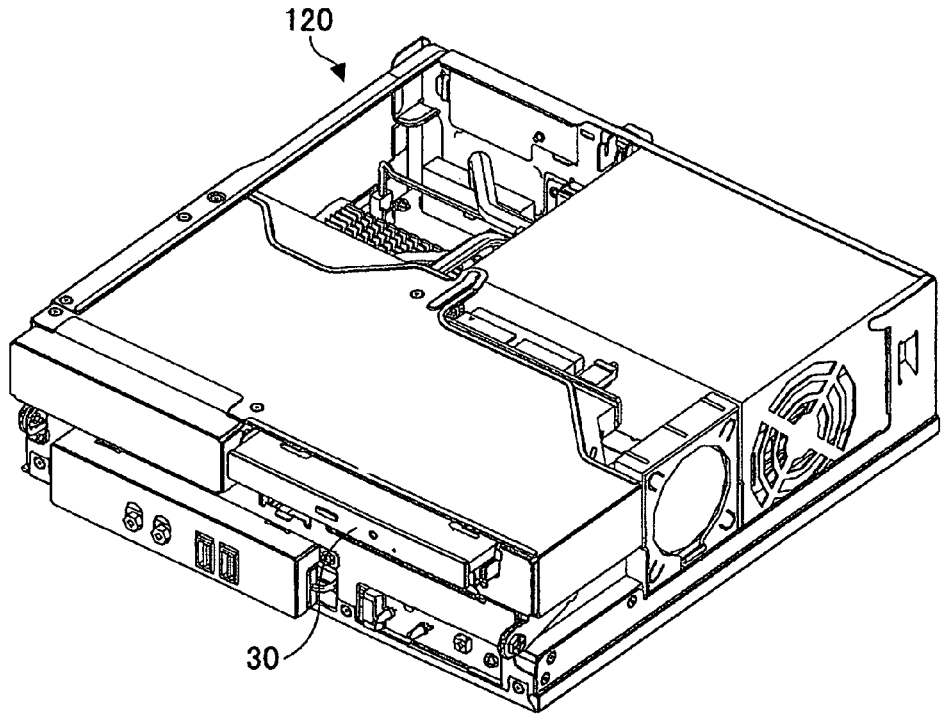

By inserting the electronic unit 30 being assembled into an electronic unit socket 121 formed in a housing body 120 of an electronic apparatus as indicated by a black arrow in FIG. 16A, the electronic unit 30 is accommodated in the housing body 120 of the electronic apparatus and is integrated into the housing body 120 (refer to FIG. 16B).

In the above-described example, the second bracket part 80, which is one of components of the electronic unit 30 to be accommodated in the housing body 120 of the electronic apparatus, is formed of the housing body 120 and another component. However, the embodiment is not limited to this example. That is, the embodiment can be applied where the second bracket part 80 is formed as a component of the housing body 120. This modification of the embodiment will be described with reference to FIG. 17A and FIG. 17B, FIG. 18A and FIG. 18B, and FIG. 19A and FIG. 19B.

Figure 17A:
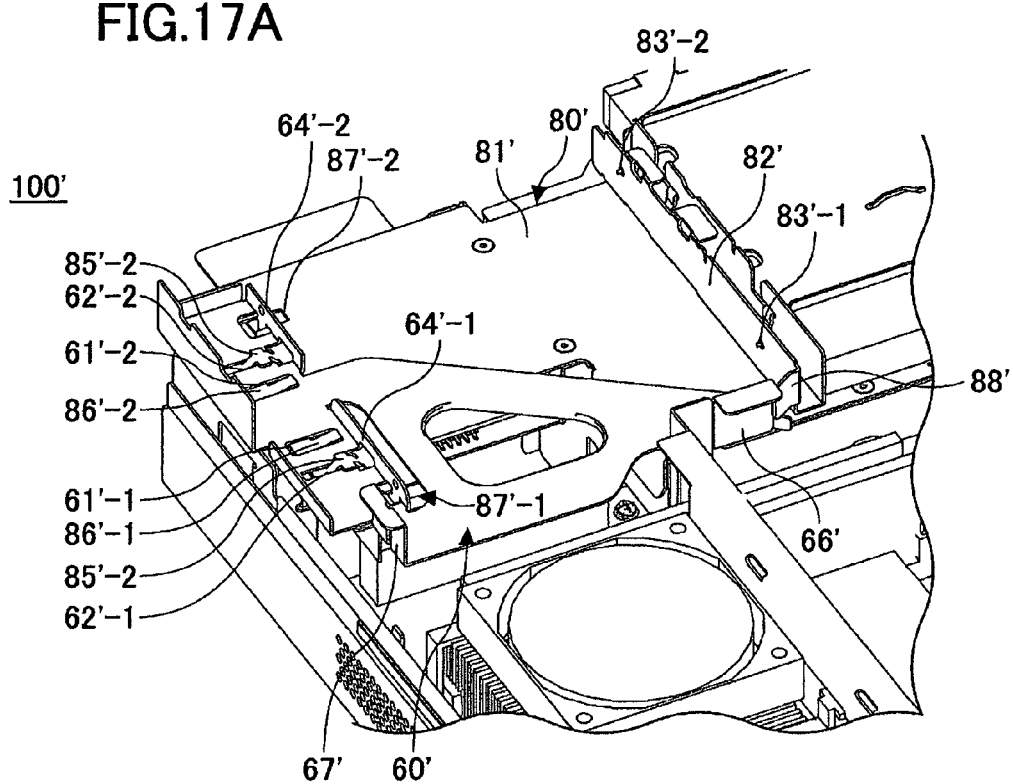
FIG. 17A and FIG. 17B are diagrams illustrating a bracket part according to a modification of the embodiment.

Referring to FIG. 17A, the first bracket part 60' formed as another component, which has the same configuration as the first bracket part 60 and is separated from the housing body 120, has the same configuration as the second bracket part 80. On a second bracket part 80' formed as the component of the housing body 120, the first bracket part 60' is provided so that the first bracket part 60' is slidable in a predetermined length in a direction indicated by an arrow H in FIG. 17B and is not separated from the second bracket part 80'. That is, since the second bracket part 80' being a fixed side of the bracket part 100' is configured as a component of the housing body 120, instead of separating a bracket structure, it is possible to directly assemble the electronic unit 30' with respect to the housing body 120.

In detail, wall parts 64'-1 and 64'-2 of the first bracket part 60' are inserted into opening parts 87'-1 and 87'-2 of the second bracket part 80'. Stopper parts 86'-1 and 86'-2 of the second bracket part 80' are inserted into opening parts 61'-1 and 61'-2 of the first bracket part 60'. Claw part 85'-1 and 85'-2 of the second bracket part 80' are inserted into opening parts 62'-1 and 62'-2 of the first bracket part 60'.

Figure 17B:
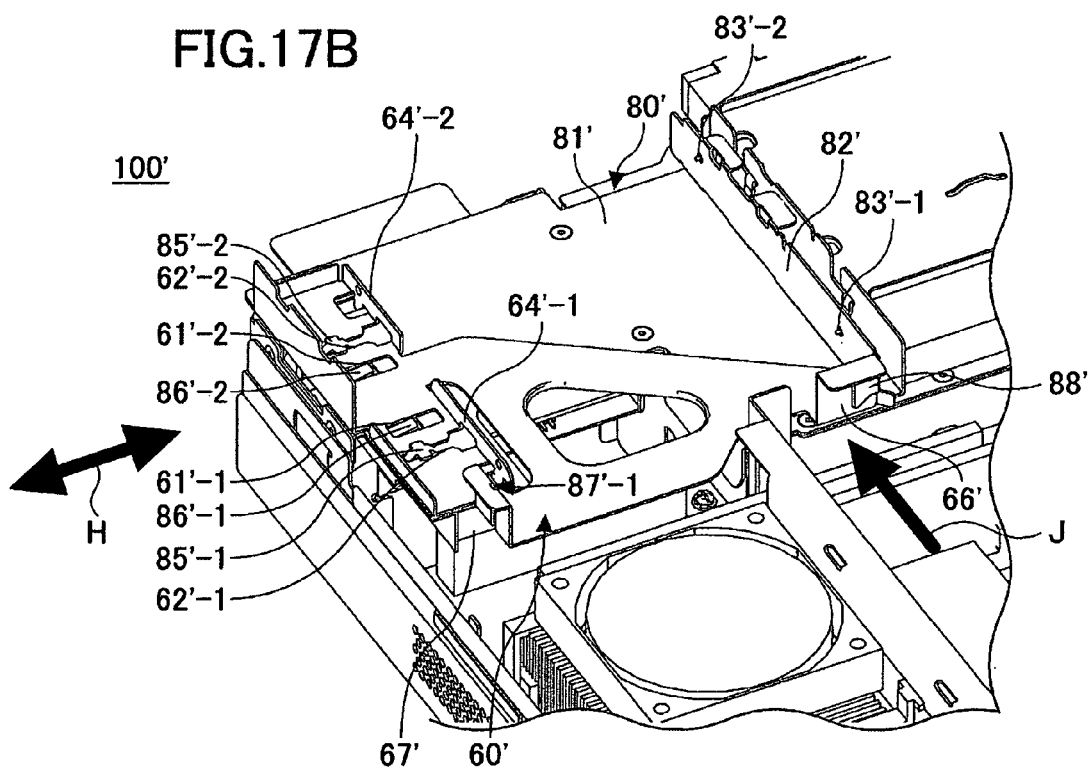

In this modification, the first bracket part 60' can slide to a direction indicated by the arrow H with respect to the second bracket part 80', and the conversion substrate 50' (not illustrated in FIG. 17A and FIG. 17B) provided to the unit body part 40' mounted in the second bracket part 80' can be pressed in a direction indicated by an arrow J in FIG. 17B.

Figure 5:
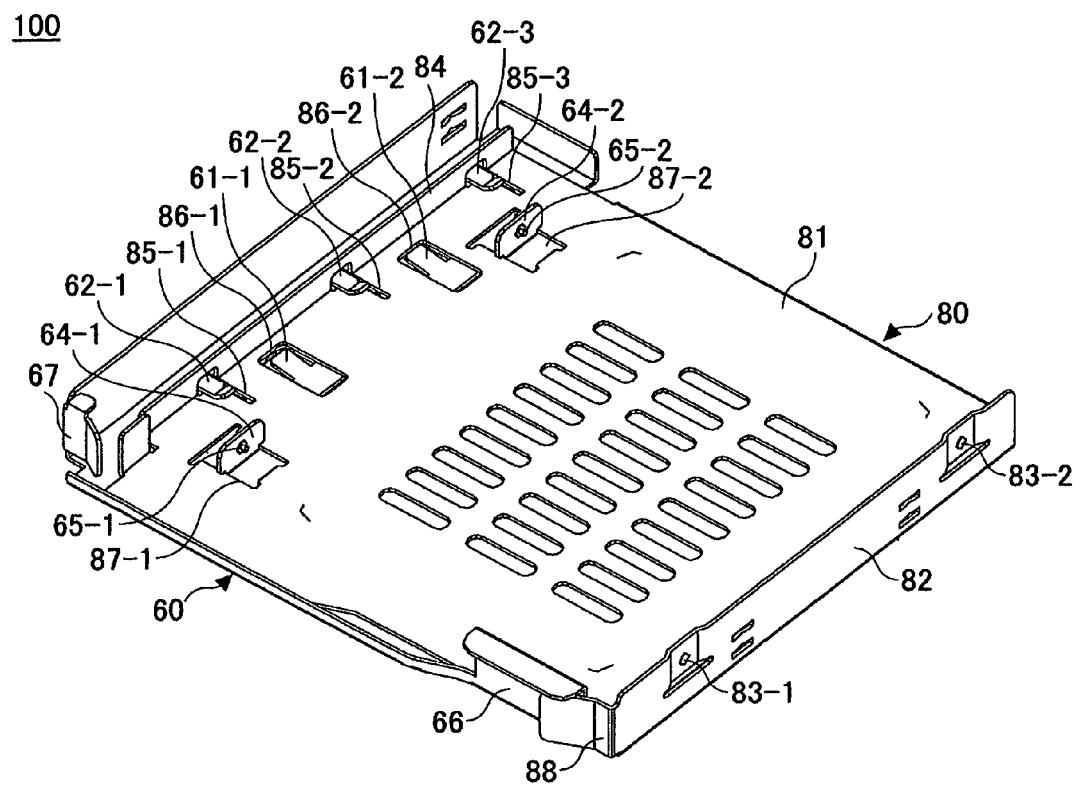
FIG. 5 is a perspective view of a bracket part.
Figure 6:
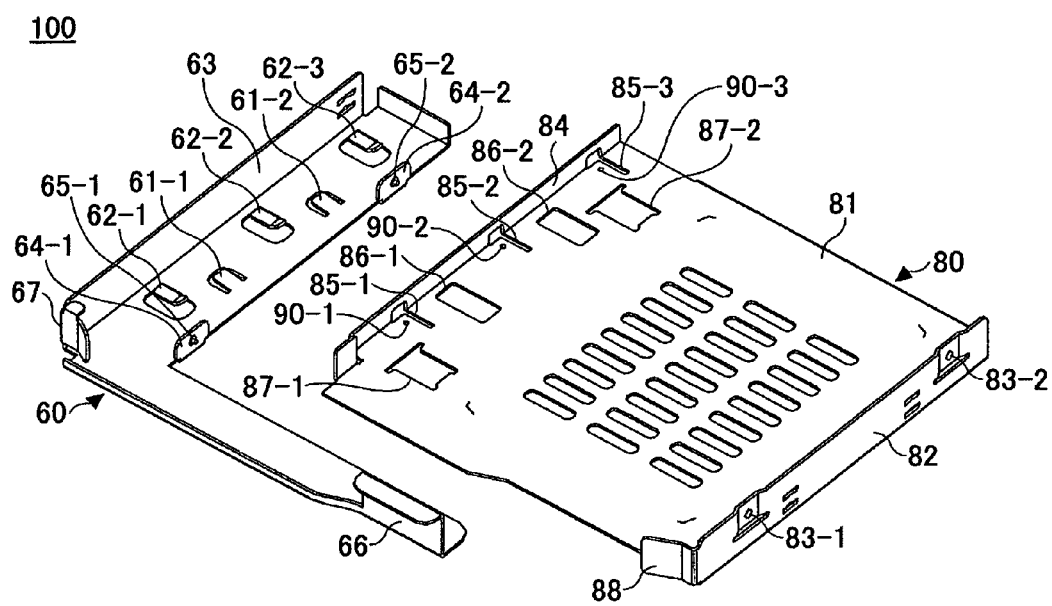
FIG. 6 is an exploded perspective view of the bracket part illustrated FIG. 5.

A substrate pressing surface 66', and a substrate fixing surface 67', a bottom surface 81', and a claw part 88' correspond to the substrate pressing surface 66, and the substrate fixing surface 67, the bottom surface 81, and the claw part 88 in FIG. 5 and FIG. 6, and the explanations thereof will be omitted.

Figure 18A:
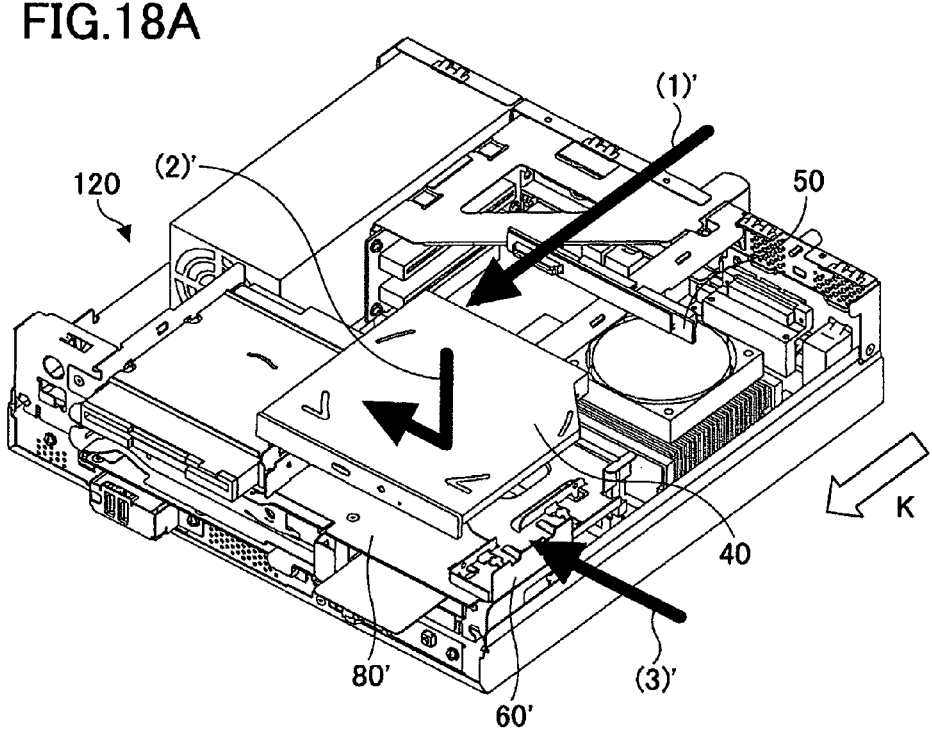
FIG. 18A and FIG. 18B are diagrams illustrating an assembly structure of an electronic unit according to the modification of the embodiment (part 1)
Figure 18B:
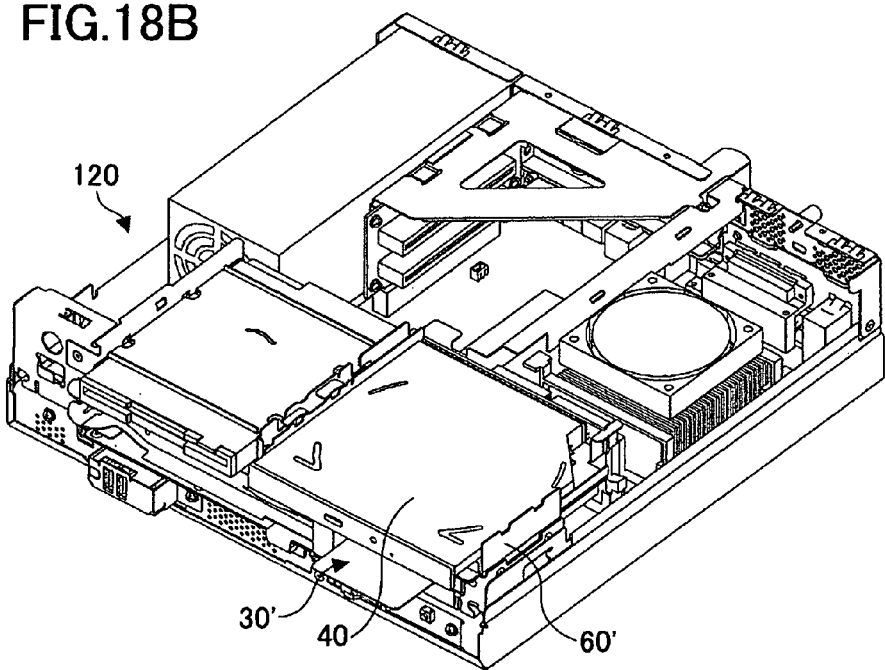
Figure 19A:
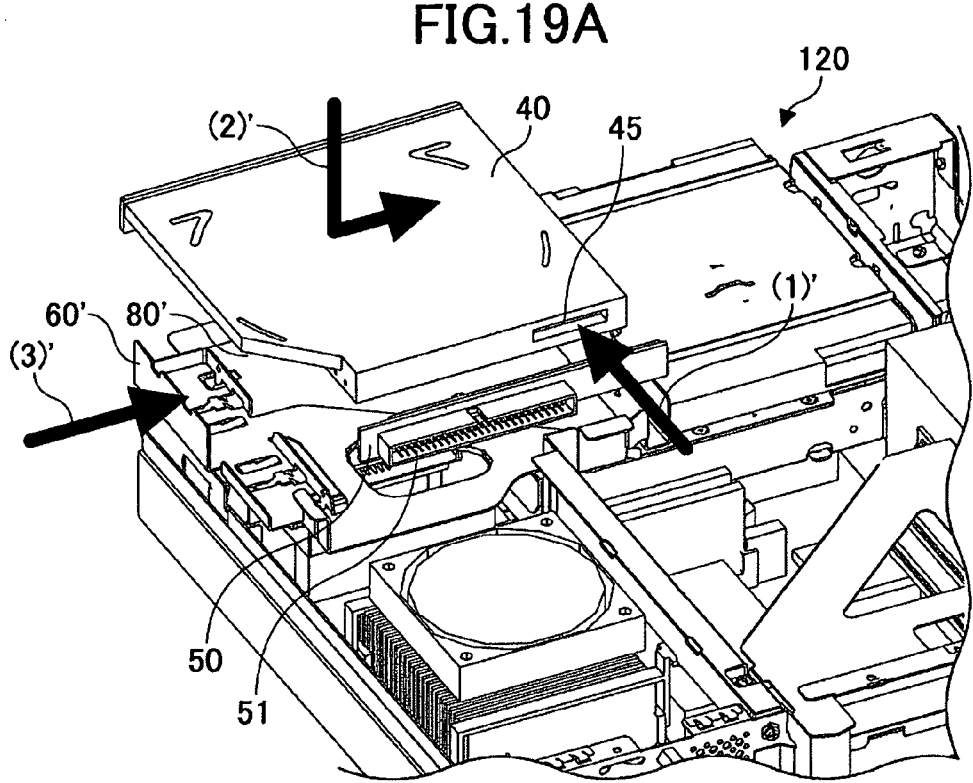
FIG. 19A and FIG. 19B are diagrams illustrating an assembly structure of an electronic unit according to the modification of the embodiment (part 2).
Figure 19B:
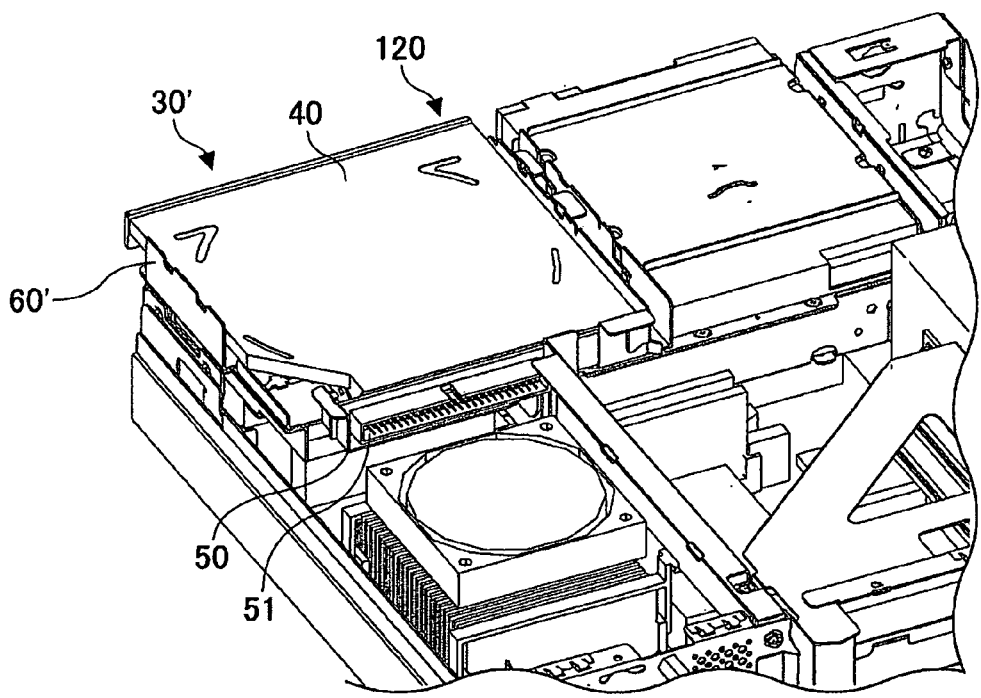

Next, an assembly structure of the electronic unit 30' including the above configuration will be described with reference to FIG. 18A, FIG. 18B, FIG. 19A, and FIG. 19B. FIG. 19A and FIG. 19B are perspective diagrams illustrating the housing body from a view from a direction indicated by an arrow K.

In assembling the electronic unit 30', as illustrated in FIG. 18A, FIG. 18B, FIG. 19A, and FIG. 19B, by inserting a connector (not illustrated) provided on a reverse side of the conversion substrate 50 into the connector socket 45 (refer to FIG. 19A) formed on one lateral surface of the unit body part 40, the conversion substrate 50 is mounted on the unit body part 40.

Subsequently, as indicated by an arrow (2)' in FIG. 18A and FIG. 19A, pins 83'-1 and 83'-2 formed on a wall part 82' of the second bracket part 80' are fit by inserting them into a concave part (not illustrated) formed on an external lateral surface of the unit body part 40 (refer to FIG. 17), the unit body part 40 to which the conversion substrate 50 is provided is mounted on the second bracket part 80'.

After that, in the same manner described with reference to FIG. 13A through FIG. 13C, FIG. 14A, FIG. 14B, FIG. 15A, and FIG. 15B, as indicated by the arrow (3)' in FIG. 18A and FIG. 19A, the first bracket part 60' is slid with respect to the second bracket part 80'. By this operation, pins formed at first lateral surfaces 64'-1 and 64'-2 of the first bracket part 60' are fit by being inserted into a concave part (not illustrated) formed on the internal lateral surface of the unit body part 40. Thus, in fixing the first bracket part 60' to the second bracket part 80', the unit body part 40 is fixed to the conversion substrate 50.

In this modification, the first bracket part 60' and the second bracket part 80' can be easily and firmly fixed to the unit body part 40 and the conversion substrate 50. Also, it is possible to test this fixation only by clamping with the first bracket part 60 and the second bracket part 80, instead of using a fastening component and tool such as a screw, and the like. Therefore, it is possible to reduce the number of operation processes. In particular, since the second bracket part 80' at the fixed side of the bracket part 100 is a component of the housing body 120, instead of separating the bracket structure, it is possible to assemble the electronic unit 30' in the housing body 120.

According to the embodiment, instead of increasing the number of components and operation processes, it is possible to provide an electronic apparatus, an assembly structure, and a bracket, which can prevent damage to or malfunction of the unit body part.

The embodiment can be applied to an optical disk apparatus such as a CD (Compact Disk) apparatus or the like, and other electronic apparatuses, in addition to an electronic unit mounted in a housing of the information processing apparatus such as a so-called desktop-type personal computer or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that the various changes, substitutions, and alterations could be made hereto without departing from the spirit and scope of the invention.

What is claimed is:

1. An electronic apparatus, comprising:
   a substrate;
   a unit body part on whose lateral surface the substrate is provided; and
   a bracket part configured to retain the unit body part, the bracket part comprising:
      a first bracket part of which a first stopper part and a second stopper part are formed on a slide surface; and
      a second bracket part on which a first opening part and a second opening part are formed, and to which the first bracket part is slidably attached,
   wherein the first bracket part is slid with respect to the second bracket part by inserting the first stopper part and the second stopper part respectively into the first opening part and the second opening part, in which a first movement amount of the first stopper part moving in the first opening part is greater than a second movement amount of the second stopper part, and
   when the bracket part is at a close position, the first bracket part fixes the substrate by pressing the substrate in a slide direction and an approximately vertical direction, and the unit body part is fixed to the bracket part.

2. The electronic apparatus as claimed in claim 1, wherein when the bracket part is at an open position, the first bracket part is positioned inclining with respect to the second bracket part, and a space is formed between the first bracket part and the substrate mounted in the unit body part.

3. The electronic apparatus as claimed in claim 1, wherein the unit body part is clamped between the first bracket part and the second bracket part and is fixed by a pin.

4. The electronic apparatus as claimed in claim 1, wherein the bracket part is made of sheet metal.

5. The electronic apparatus as claimed in claim 1, wherein when the first stopper part and the second stopper part contact respective edge surfaces of the first opening part and the second opening part, a slide of the first bracket part with respect to the second bracket part is stopped.

6. The electronic apparatus as claimed in claim 1, wherein a first opening width of the first opening part in a moving direction of the first stopper part is wider than a second opening width of the second opening part in the moving direction of the second stopper part.

7. The electronic apparatus as claimed in claim 1, wherein a first length of the first stopper part is shorter than a second length of the second stopper part.

8. The electronic apparatus as claimed in claim 1, wherein a length between the first bracket part and the second bracket part which clamp the bracket part is longer than a width of the unit body part.

9. The electronic apparatus as claimed in claim 8, wherein a difference between the length between the first bracket part and the second bracket part which clamp the bracket part and the width of the unit body part is shorter than a length of a pin.

10. The electronic apparatus as claimed in claim 5, wherein a concave part is formed in the unit body part, and
   the first stopper part, the second stopper part, the first opening part, and the second opening part are positioned inside the concave part.

11. The electronic apparatus as claimed in claim 1, wherein a connector is provided on the substrate, and
   an insertion direction of the connector into the unit body part is the same as a pressure direction of the substrate.

12. The electronic apparatus as claimed in claim 1, wherein the second bracket part is a configuration component inside a housing body of the electronic apparatus to which an electronic unit is mounted.

13. An assembly structure of an electronic unit, comprising:
   the electronic unit; and
   an electronic apparatus housing configured to accommodate the electronic unit,
   wherein the electronic unit includes the assembly structure comprising:
      a substrate;
      a unit body part at whose lateral surface the substrate is mounted; and
      a bracket part configured to retain the unit body part, the bracket part comprising:
         a first bracket part of which a first stopper part and a second stopper part are formed on a slide surface; and
         a second bracket part on which a first opening part and a second opening part are formed, and to which the first bracket part is slidably attached,
      wherein the first bracket part is slid with respect to the second bracket part by inserting the first stopper part and the second stopper part respectively into the first opening part and the second opening part, in which a first movement amount of the first stopper part moving in the first opening part is greater than a second movement amount of the second stopper part, and
      when the bracket part is at a close position, the first bracket part fixes the substrate by pressing the substrate in a slide direction and an approximately vertical direction, and the unit body part is fixed to the bracket part.

14. A bracket for mounting an electronic unit part on an electronic apparatus, the bracket comprising:
   a first bracket part of which a first stopper part and a second stopper part are formed on a slide surface; and
   a second bracket part on which a first opening part and a second opening part are formed, and to which the first bracket part is slidably attached,
   wherein the first bracket part is slid with respect to the second bracket part by inserting the first stopper part and the second stopper part respectively into the first opening part and the second opening part, in which a first movement amount of the first stopper part moving in the first opening part is greater than a second movement amount of the second stopper part, and
   when the first bracket part and the second bracket part are at a close position, the first bracket part fixes a substrate at a lateral surface of the electronic unit by pressing in a slide direction and an approximately vertical direction, and the electronic unit body part is fixed.

* * * * *